US008996825B2

(12) United States Patent
Tomiyama et al.

(10) Patent No.: US 8,996,825 B2
(45) Date of Patent: Mar. 31, 2015

(54) JUDGMENT APPARATUS, JUDGMENT METHOD, AND RECORDING MEDIUM OF JUDGMENT PROGRAM

(75) Inventors: Yoshihide Tomiyama, Kobe (JP); Masao Tomofuji, Kobe (JP)

(73) Assignee: Fujitsu Limited, Kawasaki (JP)

( * ) Notice: Subject to any disclaimer, the term of this patent is extended or adjusted under 35 U.S.C. 154(b) by 224 days.

(21) Appl. No.: 13/610,080

(22) Filed: Sep. 11, 2012

(65) Prior Publication Data
US 2013/0080721 A1 Mar. 28, 2013

(30) Foreign Application Priority Data

Sep. 28, 2011 (JP) ................................. 2011-212062

(51) Int. Cl.
*G06F 12/16* (2006.01)
*G06F 21/62* (2013.01)
*G06F 3/06* (2006.01)

(52) U.S. Cl.
CPC .......... *G06F 21/6254* (2013.01); *G06F 3/0644* (2013.01); *G06F 3/0673* (2013.01)
USPC ........... 711/154; 711/161; 711/170; 711/163; 711/E12.103

(58) Field of Classification Search
CPC . G06F 12/16; G06F 17/30289; G06F 3/0644; G06F 3/0673; G06F 21/31
USPC .......... 711/154, 170, 159, E12.103, 161, 163; 707/999.1, E17.044
See application file for complete search history.

(56) References Cited

U.S. PATENT DOCUMENTS

| 8,359,337 | B2 * | 1/2013 | Anumakonda et al. | ........ 707/802 |
|---|---|---|---|---|
| 2007/0234028 | A1 * | 10/2007 | Rothman et al. | .................. 713/1 |
| 2008/0243885 | A1 * | 10/2008 | Harger et al. | ................. 707/100 |
| 2011/0078779 | A1 * | 3/2011 | Liu et al. | ........................... 726/9 |
| 2013/0291128 | A1 | 10/2013 | Ito et al. | |
| 2014/0013065 | A1 * | 1/2014 | Arakawa et al. | .............. 711/154 |

FOREIGN PATENT DOCUMENTS

| JP | 2007-287102 | 11/2007 |
|---|---|---|
| JP | 2009-181207 | 8/2009 |
| WO | 2012/063546 | 5/2012 |

OTHER PUBLICATIONS

Initiate, "Business Scenario: Conditional Security", Mar. 26, 2007.*
Initiate, "Group Entities" Mar. 19, 2007.*
Japanese Patent Office Action dated Jan. 13, 2015 in corresponding Japanese Patent Application No. 2011-212062.

* cited by examiner

*Primary Examiner* — Pierre-Michel Bataille
(74) *Attorney, Agent, or Firm* — Staas & Halsey LLP

(57) ABSTRACT

A judgment apparatus includes a processor that executes a procedure, the procedure including obtaining a plurality of pieces of data having a certain relationship with a specific number or more of pieces of data included in a first data group, in the case that a piece of data included in a second data group different from the first data group does not have the certain relationship with the specific number or more of pieces of data included in the second data group, judging whether the piece of data has the certain relationship with the specific number or more of pieces of data included in the obtained plurality of pieces of data, and storing the piece of data in a storage device in the case that the piece of data is judged to have the given relationship with the specific number or more pieces of data.

14 Claims, 39 Drawing Sheets

FIG. 7

| NO. | PERSONAL ID | NAME | SEX | AGE | HEIGHT | WEIGHT |
|---|---|---|---|---|---|---|
| 1 | 1098 | A | MAN | 23 | 179 | 72 |
| 2 | 1234 | B | WOMAN | 39 | 154 | 46 |
| 3 | 3210 | C | MAN | 25 | 164 | 64 |
| 4 | 3456 | D | MAN | 48 | 162 | 69 |
| 5 | 5432 | E | WOMAN | 32 | 156 | 48 |
| 6 | 5678 | F | MAN | 28 | 172 | 70 |
| 7 | 7654 | G | WOMAN | 24 | 161 | 49 |
| 8 | 7890 | H | WOMAN | 23 | 165 | 61 |
| 9 | 9012 | I | WOMAN | 27 | 160 | 40 |
| 10 | 9876 | J | MAN | 31 | 169 | 69 |

FIG. 8

| NUMBER OF DUPLICATIONS | |
|---|---|
| 2 | |
| ITEM | VERIFY |
| SEX | YES |
| AGE | YES |
| HEIGHT | YES |
| WEIGHT | YES |

FIG. 9

| NO. | SEX | AGE | HEIGHT | WEIGHT |
|---|---|---|---|---|
| 1 | MAN | 20~29 | 170~179 | 70~79 |
| 2 | WOMAN | 30~39 | 150~159 | 40~49 |
| 3 | MAN | 20~29 | 160~169 | 60~69 |
| 4 | MAN | 40~49 | 160~169 | 60~69 |
| 5 | WOMAN | 30~39 | 150~159 | 40~49 |
| 6 | MAN | 20~29 | 170~179 | 70~79 |
| 7 | WOMAN | 20~29 | 160~169 | 40~49 |
| 8 | WOMAN | 20~29 | 160~169 | 60~69 |
| 9 | WOMAN | 20~29 | 160~169 | 40~49 |
| 10 | MAN | 30~39 | 160~169 | 60~69 |

FIG. 11

| NO. | SEX | AGE | HEIGHT | WEIGHT |
|---|---|---|---|---|
| 3 | MAN | 20~29 | 160~169 | 60~69 |
| 1 | MAN | 20~29 | 170~179 | 70~79 |
| 6 | MAN | 20~29 | 170~179 | 70~79 |
| 10 | MAN | 30~39 | 160~169 | 60~69 |
| 4 | MAN | 40~49 | 160~169 | 60~69 |
| 7 | WOMAN | 20~29 | 160~169 | 40~49 |
| 9 | WOMAN | 20~29 | 160~169 | 40~49 |
| 8 | WOMAN | 20~29 | 160~169 | 60~69 |
| 2 | WOMAN | 30~39 | 150~159 | 40~49 |
| 5 | WOMAN | 30~39 | 150~159 | 40~49 |

FIG. 12

| NO. | SEX | AGE | HEIGHT | WEIGHT |
|---|---|---|---|---|
| 1 | MAN | 20~29 | 170~179 | 70~79 |
| 2 | WOMAN | 30~39 | 150~159 | 40~49 |
| 5 | WOMAN | 30~39 | 150~159 | 40~49 |
| 6 | MAN | 20~29 | 170~179 | 70~79 |
| 7 | WOMAN | 20~29 | 160~169 | 40~49 |
| 9 | WOMAN | 20~29 | 160~169 | 40~49 |

FIG. 13

| NO. | SEX | AGE | HEIGHT | WEIGHT |
|---|---|---|---|---|
| 3 | MAN | 20~29 | 160~169 | 60~69 |
| 4 | MAN | 40~49 | 160~169 | 60~69 |
| 8 | WOMAN | 20~29 | 160~169 | 60~69 |
| 10 | MAN | 30~39 | 160~169 | 60~69 |

FIG. 15

| SEX | AGE | HEIGHT | WEIGHT | NUMBER OF DUPLICATE RECORDS |
|---|---|---|---|---|
| MAN | 20~29 | 170~179 | 70~79 | 2 |
| WOMAN | 20~29 | 160~169 | 40~49 | 2 |
| WOMAN | 30~39 | 150~159 | 40~49 | 2 |

FIG. 16

| NO. | SEX | AGE | HEIGHT | WEIGHT | HEALTH CONDITION | FINDING |
|---|---|---|---|---|---|---|
| 1 | MAN | 20~29 | 170~179 | 70~79 | △ | ... |
| 2 | WOMAN | 30~39 | 150~159 | 40~49 | ○ | ... |
| 3 | MAN | 20~29 | 160~169 | 60~69 | × | ... |
| 4 | MAN | 40~49 | 160~169 | 60~69 | △ | ... |
| 5 | WOMAN | 30~39 | 150~159 | 40~49 | ○ | ... |
| 6 | MAN | 20~29 | 170~179 | 70~79 | × | ... |
| 7 | WOMAN | 20~29 | 160~169 | 40~49 | ○ | ... |
| 8 | WOMAN | 20~29 | 160~169 | 60~69 | △ | ... |
| 9 | WOMAN | 20~29 | 160~169 | 40~49 | ○ | ... |
| 10 | MAN | 30~39 | 160~169 | 60~69 | × | ... |

FIG. 17

| NO. | SEX | AGE | HEIGHT | WEIGHT |
|---|---|---|---|---|
| 11 | MAN | 20~29 | 170~179 | 70~79 |
| 12 | MAN | 20~29 | 160~169 | 60~69 |
| 13 | MAN | 40~49 | 160~169 | 60~69 |
| 14 | WOMAN | 20~29 | 160~169 | 60~69 |
| 15 | MAN | 30~39 | 160~169 | 60~69 |

FIG. 18

| NO. | SEX | AGE | HEIGHT | WEIGHT |
|---|---|---|---|---|
| 3 | MAN | 20~29 | 160~169 | 60~69 |
| 12 | MAN | 20~29 | 160~169 | 60~69 |
| 11 | MAN | 20~29 | 170~179 | 70~79 |
| 10 | MAN | 30~39 | 160~169 | 60~69 |
| 15 | MAN | 30~39 | 160~169 | 60~69 |
| 4 | MAN | 40~49 | 160~169 | 60~69 |
| 13 | MAN | 40~49 | 160~169 | 60~69 |
| 8 | WOMAN | 20~29 | 160~169 | 60~69 |
| 14 | WOMAN | 20~29 | 160~169 | 60~69 |

FIG. 19

| NO. | SEX | AGE | HEIGHT | WEIGHT |
|---|---|---|---|---|
| 3 | MAN | 20~29 | 160~169 | 60~69 |
| 4 | MAN | 40~49 | 160~169 | 60~69 |
| 8 | WOMAN | 20~29 | 160~169 | 60~69 |
| 10 | MAN | 30~39 | 160~169 | 60~69 |
| 12 | MAN | 20~29 | 160~169 | 60~69 |
| 13 | MAN | 40~49 | 160~169 | 60~69 |
| 14 | WOMAN | 20~29 | 160~169 | 60~69 |
| 15 | MAN | 30~39 | 160~169 | 60~69 |

FIG. 20

| NO. | SEX | AGE | HEIGHT | WEIGHT |
|---|---|---|---|---|
| 11 | MAN | 20~29 | 170~179 | 70~79 |

FIG. 21

| SEX | AGE | HEIGHT | WEIGHT | NUMBER OF DUPLICATE RECORDS |
|---|---|---|---|---|
| MAN | 20~29 | 170~179 | 70~79 | 3 |
| WOMAN | 20~29 | 160~169 | 40~49 | 2 |
| WOMAN | 30~39 | 150~159 | 40~49 | 2 |
| MAN | 20~29 | 160~169 | 60~69 | 2 |
| MAN | 30~39 | 160~169 | 60~69 | 2 |
| MAN | 40~49 | 160~169 | 60~69 | 2 |
| WOMAN | 20~29 | 160~169 | 60~69 | 2 |

FIG. 24

| NUMBER OF DUPLICATIONS | | |
|---|---|---|
| 2 | | |
| ITEM | VERIFY | CONCEAL |
| SEX | YES | NO |
| AGE | YES | YES |
| HEIGHT | YES | YES |
| WEIGHT | YES | YES |

FIG. 26

| NO. | SEX | AGE | HEIGHT | WEIGHT | RECORD MANAGEMENT ID |
|---|---|---|---|---|---|
| 1 | MAN | 20~29 | 170~179 | 70~79 | aaa01 |
| 2 | WOMAN | 30~39 | 150~159 | 40~49 | aaa02 |
| 5 | WOMAN | 30~39 | 150~159 | 40~49 | aaa05 |
| 6 | MAN | 20~29 | 170~179 | 70~79 | aaa06 |
| 7 | WOMAN | 20~29 | 160~169 | 40~49 | aaa07 |
| 9 | WOMAN | 20~29 | 160~169 | 40~49 | aaa09 |

FIG. 27

| NO. | SEX | AGE | HEIGHT | WEIGHT | RECORD MANAGEMENT ID |
|---|---|---|---|---|---|
| 3 | MAN | 20~29 | 160~169 | 60~69 | aaa03 |
| 4 | MAN | 40~49 | 160~169 | 60~69 | aaa04 |
| 8 | WOMAN | 20~29 | 160~169 | 60~69 | aaa08 |
| 10 | MAN | 30~39 | 160~169 | 60~69 | aaa10 |

FIG. 30

| NO. | SEX | AGE | HEIGHT | WEIGHT | RECORD MANAGEMENT ID |
|---|---|---|---|---|---|
| 3 | MAN | null | null | null | aaa03 |
| 4 | MAN | null | null | null | aaa04 |
| 8 | WOMAN | null | null | null | aaa08 |
| 10 | MAN | null | null | null | aaa10 |

FIG. 32

| NO. | SEX | AGE | HEIGHT | WEIGHT | RECORD MANAGEMENT ID |
|---|---|---|---|---|---|
| 1 | MAN | 20~29 | 170~179 | 70~79 | aaa01 |
| 2 | WOMAN | 30~39 | 150~159 | 40~49 | aaa02 |
| 3 | MAN | null | null | null | aaa03 |
| 4 | MAN | null | null | null | aaa04 |
| 5 | WOMAN | 30~39 | 150~159 | 40~49 | aaa05 |
| 6 | MAN | 20~29 | 170~179 | 70~79 | aaa06 |
| 7 | WOMAN | 20~29 | 160~169 | 40~49 | aaa07 |
| 8 | WOMAN | null | null | null | aaa08 |
| 9 | WOMAN | 20~29 | 160~169 | 40~49 | aaa09 |
| 10 | MAN | null | null | null | aaa10 |

FIG. 33

| NO. | SEX | AGE | HEIGHT | WEIGHT | RECORD MANAGEMENT ID |
|---|---|---|---|---|---|
| 3 | MAN | 20~29 | 160~169 | 60~69 | aaa03 |
| 4 | MAN | 40~49 | 160~169 | 60~69 | aaa04 |
| 8 | WOMAN | 20~29 | 160~169 | 60~69 | aaa08 |
| 10 | MAN | 30~39 | 160~169 | 60~69 | aaa10 |

FIG. 34

| NO. | SEX | AGE | HEIGHT | WEIGHT |
|---|---|---|---|---|
| 12 | MAN | 20~29 | 160~169 | 60~69 |
| 13 | MAN | 40~49 | 160~169 | 60~69 |
| 14 | WOMAN | 20~29 | 160~169 | 60~69 |
| 15 | MAN | 30~39 | 160~169 | 60~69 |

FIG. 35

| NO. | SEX | AGE | HEIGHT | WEIGHT |
|---|---|---|---|---|
| 11 | MAN | 20~29 | 170~179 | 70~79 |

FIG. 36

| NO. | SEX | AGE | HEIGHT | WEIGHT | RECORD MANAGEMENT ID | |
|---|---|---|---|---|---|---|
| 3 | MAN | 20~29 | 160~169 | 60~69 | aaa03 | UPDATE |
| 4 | MAN | 40~49 | 160~169 | 60~69 | aaa04 | UPDATE |
| 8 | WOMAN | 20~29 | 160~169 | 60~69 | aaa08 | UPDATE |
| 10 | MAN | 30~39 | 160~169 | 60~69 | aaa10 | UPDATE |
| 11 | MAN | 20~29 | 170~179 | 70~79 | bbb01 | ADD |
| 12 | MAN | 20~29 | 160~169 | 60~69 | bbb02 | ADD |
| 13 | MAN | 40~49 | 160~169 | 60~69 | bbb03 | ADD |
| 14 | WOMAN | 20~29 | 160~169 | 60~69 | bbb04 | ADD |
| 15 | MAN | 30~39 | 160~169 | 60~69 | bbb05 | ADD |

FIG. 37

| NO. | SEX | AGE | HEIGHT | WEIGHT | RECORD MANAGEMENT ID |
|---|---|---|---|---|---|
| 1 | MAN | 20~29 | 170~179 | 70~79 | aaa01 |
| 2 | WOMAN | 30~39 | 150~159 | 40~49 | aaa02 |
| 3 | MAN | 20~29 | 160~169 | 60~69 | aaa03 |
| 4 | MAN | 40~49 | 160~169 | 60~69 | aaa04 |
| 5 | WOMAN | 30~39 | 150~159 | 40~49 | aaa05 |
| 6 | MAN | 20~29 | 170~179 | 70~79 | aaa06 |
| 7 | WOMAN | 20~29 | 160~169 | 40~49 | aaa07 |
| 8 | WOMAN | 20~29 | 160~169 | 60~69 | aaa08 |
| 9 | WOMAN | 20~29 | 160~169 | 40~49 | aaa09 |
| 10 | MAN | 30~39 | 160~169 | 60~69 | aaa10 |
| 11 | MAN | 20~29 | 170~179 | 70~79 | bbb01 |
| 12 | MAN | 20~29 | 160~169 | 60~69 | bbb02 |
| 13 | MAN | 40~49 | 160~169 | 60~69 | bbb03 |
| 14 | WOMAN | 20~29 | 160~169 | 60~69 | bbb04 |
| 15 | MAN | 30~39 | 160~169 | 60~69 | bbb05 |

JUDGMENT APPARATUS, JUDGMENT METHOD, AND RECORDING MEDIUM OF JUDGMENT PROGRAM

CROSS-REFERENCE TO RELATED APPLICATIONS

This application is based upon and claims the benefit of priority of the prior Japanese Patent Application No. 2011-212062, filed on Sep. 28, 2011, the entire contents of which are incorporated herein by reference.

FIELD

The embodiments discussed herein are related to concealment of data.

BACKGROUND

There are technologies that process collected personal information into anonymized information in order to inhibit an individual from being identified. Even when personal information is generally processed into anonymized information, the anonymized information is classified as personal information if an individual can be identified by a comparison of that anonymized information with other information (referred to as "easy comparability"). Unfortunately, there is no objective criterion for judging whether there is "easy comparability", and it is difficult, for this reason, to judge whether anonymized information can be safely used. This "easy comparability" involves the following viewpoints. (1) Is anonymized information placed in circumstances where the anonymized information can be easily compared to other information? (2) As a result of a comparison of the anonymized information with other information, can an individual be identified?

With regard to viewpoint (1), measures that include data management (reference authority, a reference range, and measures against information leakages) are taken, and, as a result, easy comparability may be inhibited. A judgment is therefore impossible only by software. With regard to viewpoint (2), which is also referred to as personal identifiability, information is processed in such a manner that records by which an individual may be identified are removed, so that safer anonymized information may be generated. In this way, an individual is not identified even if anonymized information may be easily compared to other information, and even if information by which an individual is identified leaks elsewhere. Anonymized information may therefore be used safely.

The technologies that process personal information into anonymized information include, for example, a technology that compares information to personal information, and, as a result, judges the information as being information that may lead to identification of an individual and removes the information, thereby turning the information into anonymized information.

There is also a technology that verifies personal identifiability using duplication of records in anonymized information, so that data processing is performed. This technology uses a rule indicating that if the number of duplications of records in anonymized information is N or more (where N is an integer that is set to be greater than or equal to 2), since the number of results obtained by comparing the anonymized information to personal information is N or more, and an individual is unable to be identified by the anonymized information.

Specifically, processing as illustrated in FIG. 1 is performed. The anonymized information illustrated on the left of FIG. 1 includes three records. Records in two rows from the top are identical, and it has been verified that there is no identifiability when the number of identical records is two or more. Therefore, these records are judged to be [OK] and are added to verified, anonymized information. However, a record consisting of ABCD is placed in only one row, and therefore there is personal identifiability. Accordingly, this record is judged to be [Failed]. Then, for example, attribute values B and C, which are part of the record consisting of ABCD, are each converted into X, and a record consisting of AXXD is added to the verified, anonymized information. The record consisting of ABCD itself is discarded. The above processing method is effective for processing records that have already been accumulated in one database.

Unfortunately, a problem arises where data appropriately collected from various business systems is anonymized, and the anonymized data is output to other systems that utilize that anonymized data. Specifically, when firstly the three records as illustrated on the left of FIG. 1 are collected, then processing of the three records is performed as described above, and data illustrated on the right of FIG. 1 is output to other systems. Thereafter, when three new records as illustrated on the left of FIG. 2 are collected, and processing of the three new records is performed as described above, it is verified that two rows from the top of the three new records are identical and there is no personal identifiability. These records are therefore judged to be [OK] and are added to verified, anonymized information. However, a record consisting of ABCD is placed in only one row, and therefore there is personal identifiability. Accordingly, this record is judged to be [Failed]. Then, attribute values B and C, which are part of the record consisting of ABCD, are each converted into X, and a record consisting of AXXD is added to the verified, anonymized information. The record consisting of ABCD itself is discarded. In this manner, although the record consisting of ABCD appears twice, the collection timings are different, and therefore the record "AXXD" is twice registered in the verified, anonymized information. As a result of this, however, information of ABCD is lost, which leads to an obstacle to statistical processing or the like in other systems.

SUMMARY

According to an aspect of the invention, a judgment apparatus includes a processor that executes a procedure, the procedure including obtaining a plurality of pieces of data having a certain relationship with a specific number or more of pieces of data included in a first data group, in the case that a piece of data included in a second data group different from the first data group does not have the certain relationship with the specific number or more of pieces of data included in the second data group, judging whether the piece of data has the certain relationship with the specific number or more of pieces of data included in the obtained plurality of pieces of data, and storing the piece of data in a storage device in the case that the piece of data is judged to have the given relationship with the specific number or more pieces of data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of collected data.

FIG. 8 illustrates an example of definition data according to the first embodiment.

FIG. 9 illustrates an example of converted data.

FIG. 11 is a table that illustrates a verification result in the first verification processing.

FIG. 12 illustrates an example of a group of verification success records in the first verification processing.

FIG. 13 illustrates an example of a group of verification failure records in the first verification processing.

FIG. 15 illustrates an example of data stored in a verification success data storage unit in a first round of processing.

FIG. 16 illustrates an example of data processing in a target system.

FIG. 17 illustrates an example of data that is collected next and converted.

FIG. 18 is an example of a table that illustrates a verification result in a second round of the first verification processing.

FIG. 19 illustrates an example of a group of verification success records in the second round of the first verification processing.

FIG. 20 illustrates an example of a group of verification failure records in the second round of the first verification processing.

FIG. 21 illustrates an example of data stored in a verification success data storage unit after the second round of the second verification processing.

FIG. 24 illustrates an example of definition data according to the second embodiment.

FIG. 26 illustrates an example of records judged to be verification success records in the third verification processing.

FIG. 27 illustrates an example of records judged to be verification failure records in the third verification processing.

FIG. 30 is an example of a table illustrating the concealment of a verification failure record.

FIG. 32 illustrates an example of distribution data.

FIG. 33 illustrates an example of a record specified as restoration data by a second round of the third verification processing.

FIG. 34 illustrates an example of records specified as verification success records in the second round of the third verification processing.

FIG. 35 illustrates an example of a record specified as a verification failure record in the second round of the third verification processing.

FIG. 36 illustrates an example of second distribution data.

FIG. 37 illustrates an example of data accumulated in target systems.

DESCRIPTION OF EMBODIMENTS

Figure 1:
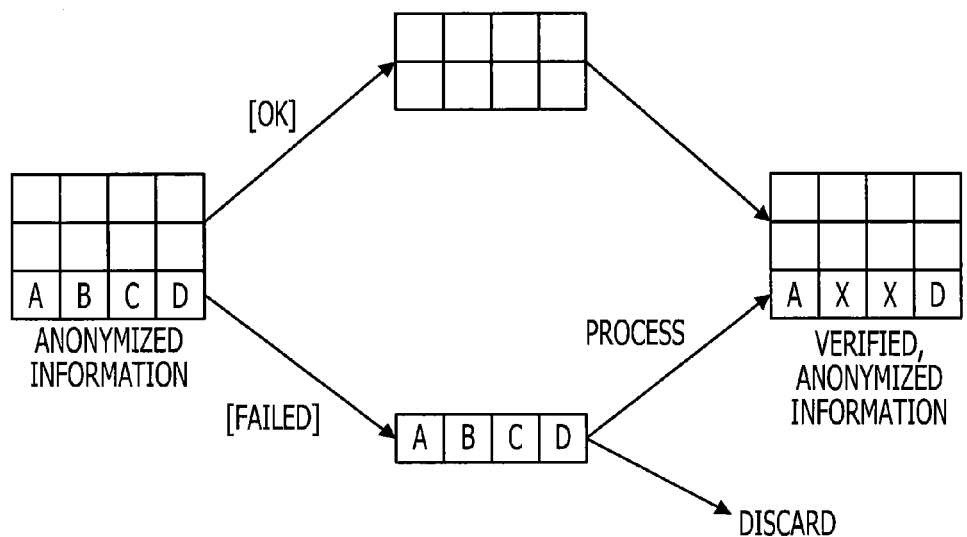
FIG. 1 is an explanatory illustration of the related art.
Figure 2:
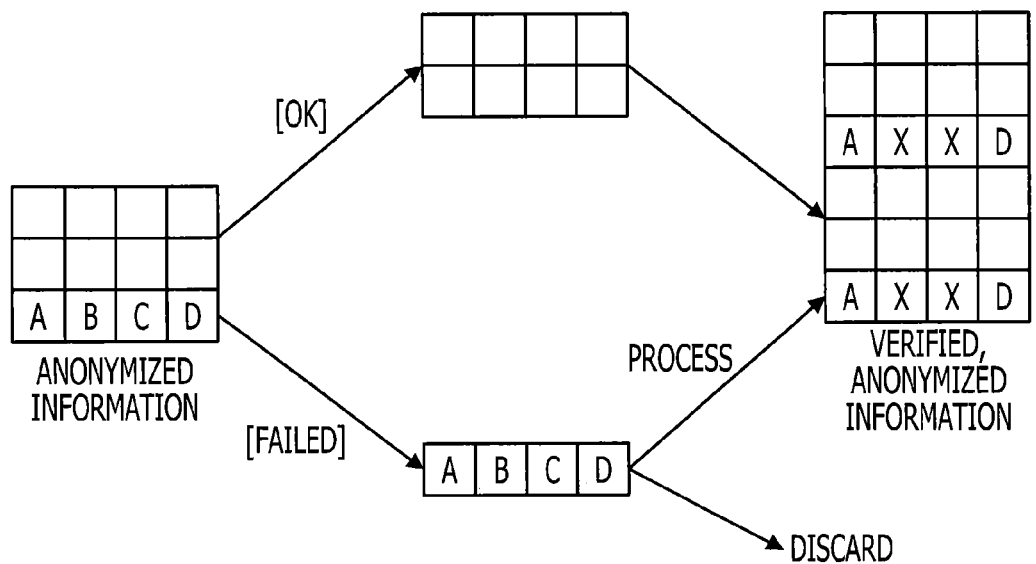
FIG. 2 is an explanatory illustration of the related art.
Figure 3:
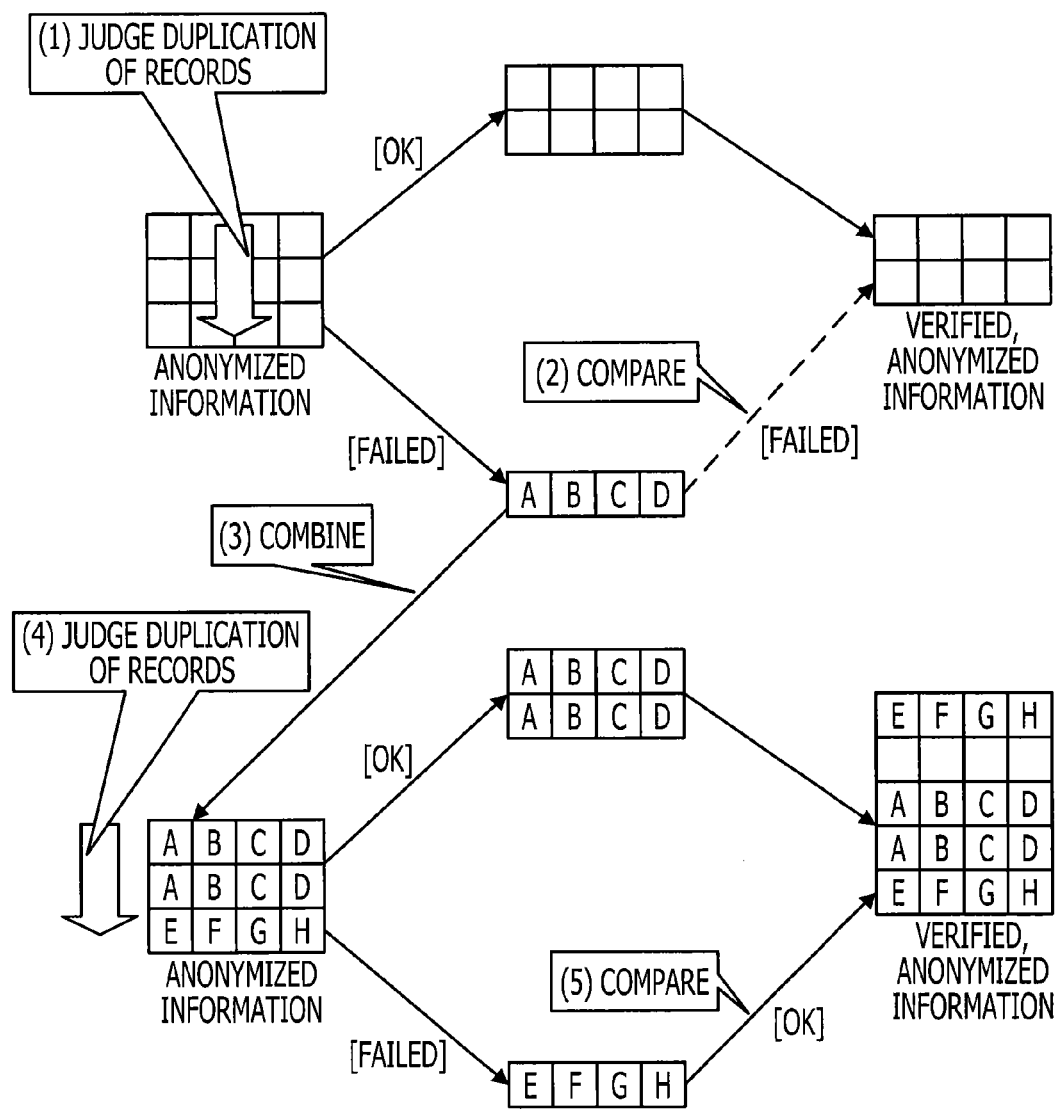
FIG. 3 illustrates an outline of processing of a first embodiment.

With reference to FIG. 3, the outline of processing in a first embodiment will be described. An information processing apparatus that performs processing in this embodiment collects data from one or a plurality of business systems (also referred to as "source systems"), anonymizes the collected data, and performs a process as described below, and then distributes the processed data to other systems (also referred to as "target systems") that utilize anonymized information. For example, when three records are collected as illustrated on the upper left side of FIG. 3, duplication of records is judged among the three records (step (1)). Note that the three records are data obtained after data conversion processing for anonymization (for example, converting data into data of a corresponding range of values, converting data into Japanese syllabary, or discarding an attribute that forms part of the records).

If it is judged in step (1) that N or more records (where N is an integer that is set to be greater than or equal to 2), for example, are duplicate records, there is no personal identifiability, and therefore these records are judged to be [OK] and added to verified, anonymized information. In the example of FIG. 3, N is 2. In the example of FIG. 3, the upper two records are added to the verified, anonymized information. In contrast, the lowermost record that includes attribute values of A, B, C, and D is not a duplicate of any other record, and as a result, there is personal identifiability. This record is therefore judged to be [Failed]. However, the record that includes ABCD is compared to the verified, anonymized information to check whether a record that matches this record is included in the verified, anonymized information (step (2)). In this example, because there is no record that is a duplicate of the record that includes ABCD, the record that includes ABCD is also judged to be [Failed] in step (2). In this embodiment, the record that includes ABCD is not discarded, and is held so as to be used when judging a subsequently collected record regarding whether there is a duplicate record of the subsequently collected record. The verified, anonymized information is distributed to target systems.

Next, when two records are collected from a source system, the two records are combined with the held record (step (3)), and all three records are judged in terms of duplication of records (step (4)). For example, when a record that includes ABCD and a record that includes EFGH are newly collected from a source system, these records are judged together with the record that includes ABCD, which has been held, in terms of duplication of records. In this case, since there is no personal identifiability in the records that include ABCD, the records that include ABCD are added to the verified, anonymized information. Regarding the record that includes EFGH, in contrast, there is no duplication among the three records, and therefore there is personal identifiability. The record that includes EFGH is judged to be [Failed]. The record that includes EFGH is compared to the verified, anonymized information to check whether a record that matches this record is included in the verified, anonymized information (step (5)). In the example of FIG. 3, since the record that includes EFGH is already included in the verified, anonymized information, the record that is currently collected and includes EFGH is judged to be [OK] and is added to the verified, anonymized information. Thus, the three records verified this time are distributed to target systems.

By performing a process such as that described above, more records are enabled to be effectively utilized in target systems. Moreover, each time records are collected, a process such as that described above is performed on the collected records. This allows target systems to perform processing, such as statistical processing, on the latest data without impairing immediacy.

Figure 4:
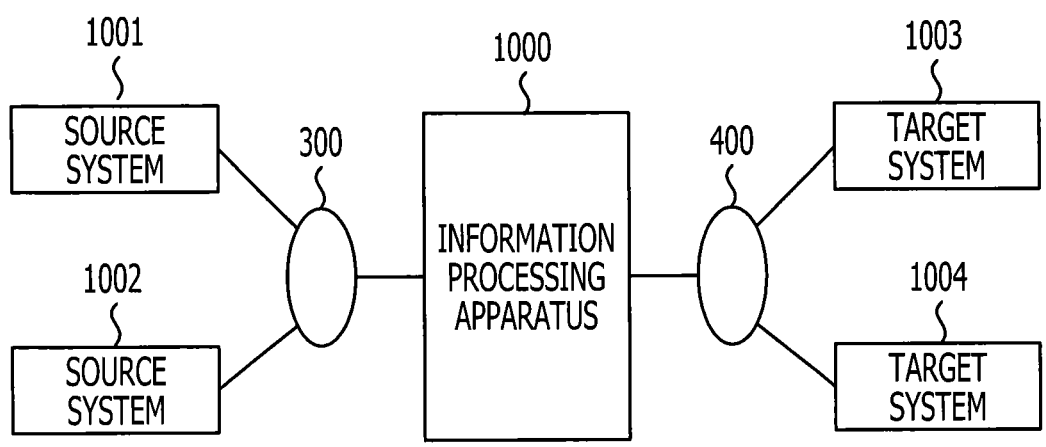
FIG. 4 illustrates an outline of a system according to the first embodiment.

The outline of a system according to this embodiment will next be described with reference to FIG. 4 and FIG. 5. As illustrated in FIG. 4, an information processing apparatus 1000 that performs primary processing according to this embodiment is coupled via a network 300 to source systems 1001 and 1002, and is coupled via a network 400 to target systems 1003 and 1004. A single source system and a single target system may be provided. The source systems 1001 and 1002 transmit, for example, data to be stored in their own databases via the network 300 to the information processing apparatus 1000.

The target systems 1003 and 1004 also accumulate data received via the network 400 from the information processing apparatus 1000, for example, in their own databases, and, asynchronously with data reception, perform processing in response to requests from other device and the like.

Figure 5:
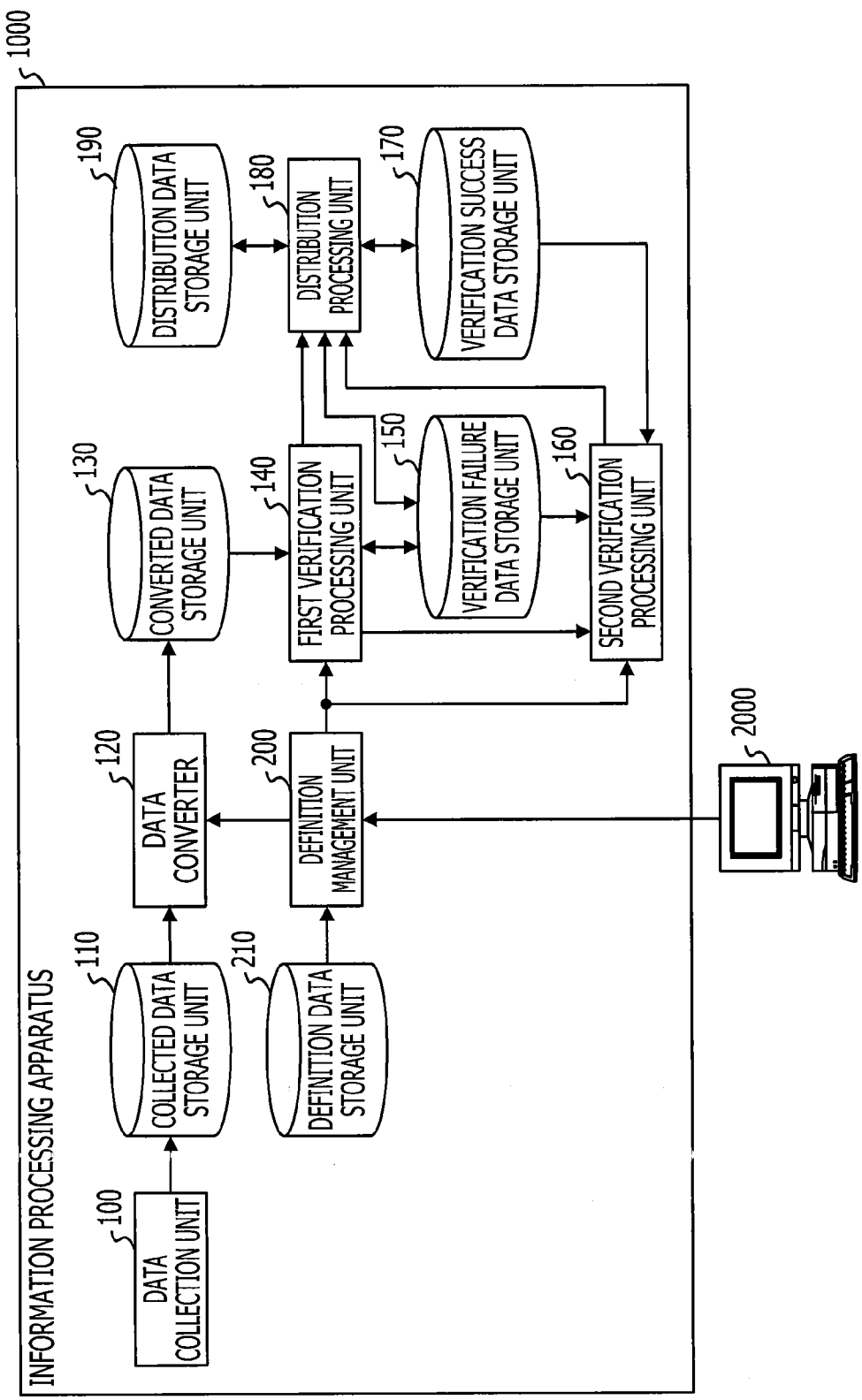
FIG. 5 illustrates an example of a functional block of an information processing apparatus according to the first embodiment.

FIG. 5 is a functional block diagram of the information processing apparatus 1000. The information processing apparatus 1000 includes a data collection unit 100, a collected data storage unit 110, a data converter 120, a converted data storage unit 130, a first verification processing unit 140, a verification failure data storage unit 150, a second verification processing unit 160, and a verification success data storage unit 170, a distribution processing unit 180 that distributes anonymized data via the network 400 to the target systems, a distribution data storage unit 190, a definition management unit 200, and a definition data storage unit 210.

The data collection unit 100 receives data via the network 300 from the source systems 1001 and 1002, and stores the data in the collected data storage unit 110. The data converter 120 performs data conversion processing in accordance with data stored in the definition data storage unit 210, and stores a processing result in the converted data storage unit 130. The first verification processing unit 140 performs verification processing on data stored in the converted data storage unit 130 and the verification failure data storage unit 150 in accordance with the data stored in the definition data storage unit 210. Then, the first verification processing unit 140 outputs a record that results in verification success to the distribution processing unit 180, and stores, in the verification failure data storage unit 150, a record that results in verification failure.

The second verification processing unit 160 performs verification processing on data stored in the verification failure data storage unit 150 in accordance with data that is stored in the definition data storage unit 210 for data stored in the verification success data storage unit 170. Then, the second verification processing unit 160 outputs a record that resulted in verification success to the distribution processing unit 180, and stores, in the verification failure data storage unit 150, a record that resulted in verification failure. The distribution processing unit 180 stores, in the distribution data storage unit 190, the data received from the first verification processing unit 140 and the second verification processing unit 160, and updates the verification success data storage unit 170 using the received data. Then, the distribution processing unit 180 transmits data stored in the distribution data storage unit 190 via the network 400 to the target systems 1003 and 1004.

The definition management unit 200 stores, in the definition data storage unit 210, definition data for data conversion processing and verification processing, in accordance with an instruction from an administrator terminal 2000. The definition management unit 200 sets data that is stored in the definition data storage unit 210 in the data converter 120, the first verification processing unit 140, the second verification processing unit 160, and the like.

With reference to FIG. 6 to FIG. 21, processing of the information processing apparatus 1000 will be described next. First, the data collection unit 100 collects data from the source system 1001 or 1002, and stores the collected data in the collected data storage unit 110 (FIG. 6: S1). For example, the data collection unit 100 collects data as illustrated in FIG. 7 and stores the data in the collected data storage unit 110. In the example given in FIG. 7, each record contains a personal identifier (ID), name, sex, age, height, and weight. Note that a number (No.) is contained in each record for the sake of convenience of identification of the record in a description of the subsequent processing; however, in reality, the number is not contained.

Then, the data converter 120 performs a specified data conversion in accordance with definition data stored in the definition data storage unit 210, and stores a processing result in the converted data storage unit 130 (S3). In this embodiment, the data converter 120 is set the definition data by the definition management unit 200. An example of the definition data stored in the definition data storage unit 210 is illustrated in FIG. 8. The example of FIG. 8 includes the number of duplications, which is a judging criterion for anonymization, and data indicating whether listed items are to be verified. In the example of FIG. 8, "sex", "age", "height", and "weight" are listed as items, and data of other items is discarded for anonymization purposes. Specifically, the data converter 120 discards "personal ID" and "name". In this embodiment, as an example of making data of items ambiguous, it is judged which of a range of values that has been determined in advance the data of an item indicated to be verified belongs to, and then the data of the item is replaced by data that specifies the range of values. For example, in the case of "A" whose height is "179", the data of the height belongs to a range of values of 170-179, and is replaced by identification data for the range of values concerned. The data of the items "age" and "weight" is similarly replaced. As a result, the data of FIG. 7 is converted into the data illustrated in FIG. 9. In the example of FIG. 9, the items "personal ID" and "name" are discarded, and the item "sex" remains intact. The data of items "age", "height", and "weight" are replaced by data that specifies ranges of values to which the data of the items belongs as described above.

Then, the first verification processing unit 140 performs first verification processing of data stored in the converted data storage unit 130 in accordance with definition data stored in the definition data storage unit 210 (S5). With reference to FIG. 10 to FIG. 13, the first verification processing will be described.

Figure 10:
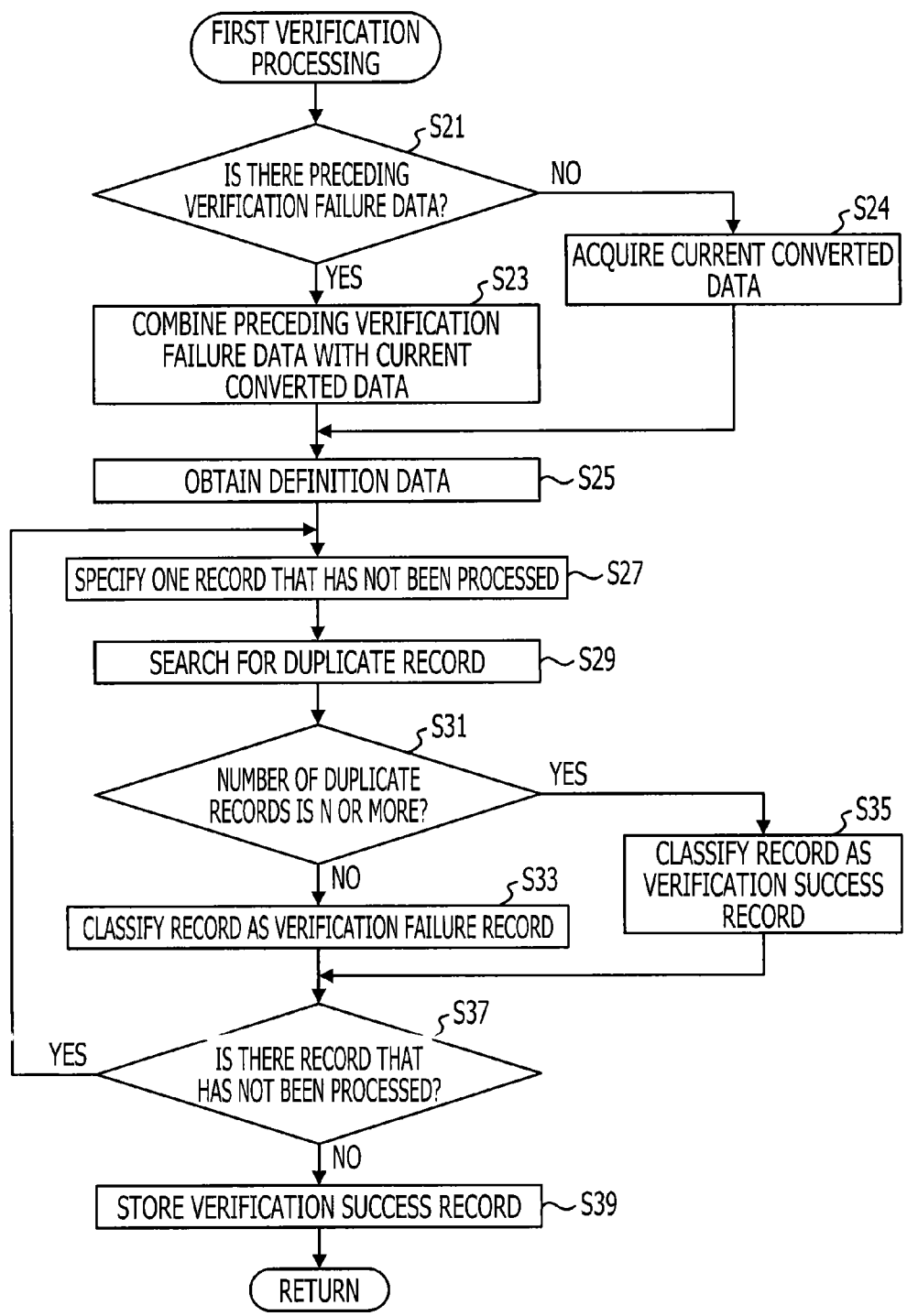
FIG. 10 illustrates an example of a processing flow for first verification processing.

In the first verification processing, the first verification processing unit 140 first checks whether previous verification failure data is stored in the verification failure data storage unit 150 (FIG. 10: S21). If there is no previous verification failure data, then the first verification processing unit 140 reads converted data for the current processing from the converted data storage unit 130 (S24). Then, the process proceeds to S25. On the other hand, if there is previous verification failure data, then the first verification processing unit 140 combines the previous verification failure data with the converted data for the current processing stored in the converted data storage unit 130 (S23).

Then, the first verification processing unit 140 obtains definition data from the definition data storage unit 210 (S25). Specifically, items to be verified are specified. In the example of FIG. 8, "sex", "age", "height", and "weight" are to be verified. Hereinafter, assume that "records that match" or "records that are identical" means records that are the same in terms of the values of items to be verified.

Then, the first verification processing unit 140 specifies one record that has not yet been processed among data to be processed (the data read in S24 or the data combined in S23) (S27). Thereafter, the first verification processing unit 140 searches for a record that matches the specified record out of the data to be processed (S29). In accordance with the definition data illustrated in FIG. 8, the verification is successful if there are two or more records that are identical. When there is no previous verification failure data and processing in S29 is performed on the data illustrated in FIG. 9, a result as illustrated in FIG. 11 is obtained. FIG. 11 illustrates that records number 1 and number 6 match, records number 7 and number 9 match, and records number 2 and number 5 match. There is no record that matches records number 3, number 10, number 4, or number 8.

Then, the first verification processing unit 140 judges whether the number of records that are duplicates of the specified record is N or more (where N is "2" in the example of the definition data of FIG. 8, and is, in general, an integer that is set to be greater than or equal to 2) (S31). If the number of duplicate records is N or more, the first verification processing unit 140 classifies the specified record as a verification success record (S35). For example, the first verification processing unit 140 registers the specified record and the detected records equal to the specified record in a verification success list in a storage device, such as a main memory. Then, the process proceeds to S37.

On the other hand, if the number of duplicate records is less than N, then the first verification processing unit 140 classifies the specified record as a verification failure record (S33). In this embodiment, the specified record is stored in the verification failure data storage unit 150.

Then, the first verification processing unit 140 judges whether there is a record that has not yet been processed among data to be processed (S37). If there is a record that has not yet been processed, then the process returns to S27. On the other hand, if there is no record that has not yet been processed, then the first verification processing part 140 outputs the verification success record to the distribution processing unit 180, and the distribution processing unit 180 stores the received verification success record in the distribution data storage unit 190 (S39). Thereafter, the process returns to processing of the call source.

In this way, data to be processed is classified into two groups. For each record of one group, it is judged that the number of records that are duplicates of the record is N or more and therefore the record is a verification success record (hereinafter, this group is referred to as a "group of verification success records"). For each record of the other group, it is judged that the number of records that are duplicates of the record is less than N and therefore the record is a verification failure record (hereinafter, this group is referred to as a "group of verification failure records"). For example, as described with reference to FIG. 11, the group of verification success records, which is a record group as illustrated in FIG. 12, is stored in the distribution data storage unit 190. In contrast, the group of verification failure records, which is a record group as illustrated in FIG. 13, is temporarily stored in the verification failure data storage unit 150.

Figure 6:
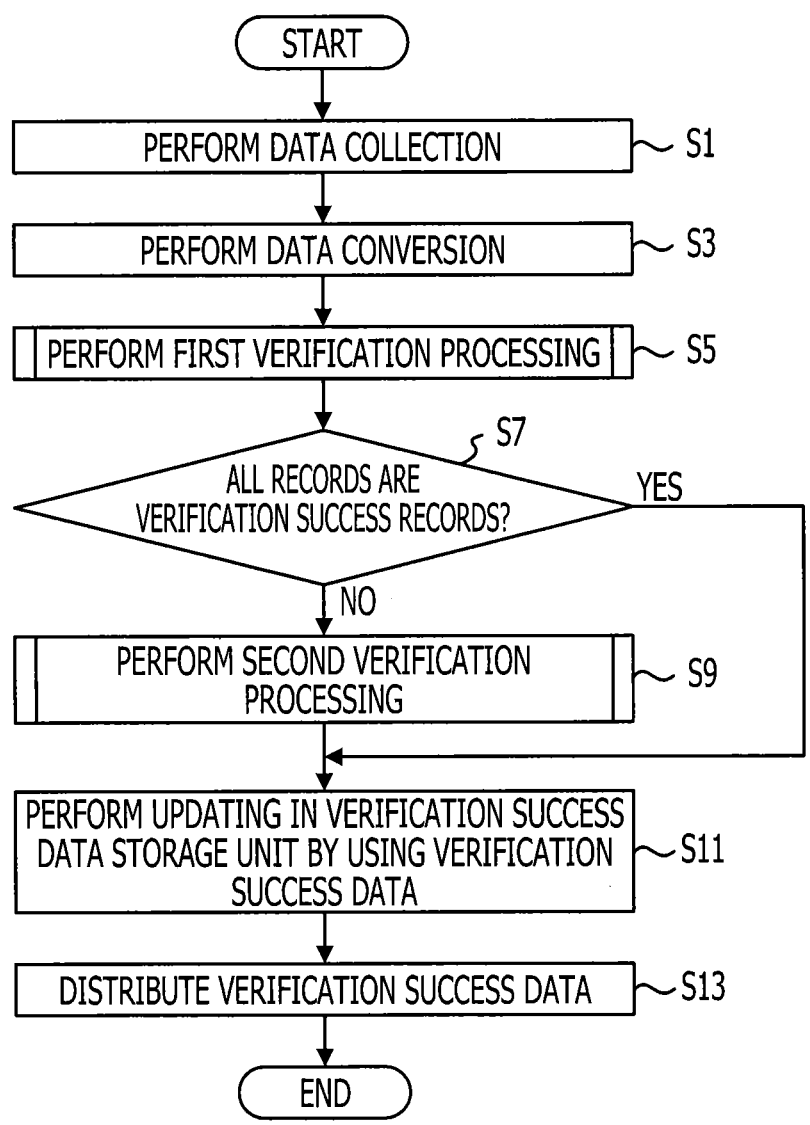
FIG. 6 illustrates an example of a processing flow of the information processing apparatus according to the first embodiment.

Returning to the description of processing for FIG. 6, the first verification processing unit 140 judges whether all the records in the data to be processed have been judged to be verification success records (S7). If all the records are verification success records, then the process moves to S11. On the other hand, if there is a verification failure record, then the second verification processing unit 160 is instructed to perform processing, and the second verification processing unit 160 performs second verification processing (S9). The second verification processing will be described with reference to FIG. 14.

Figure 14:
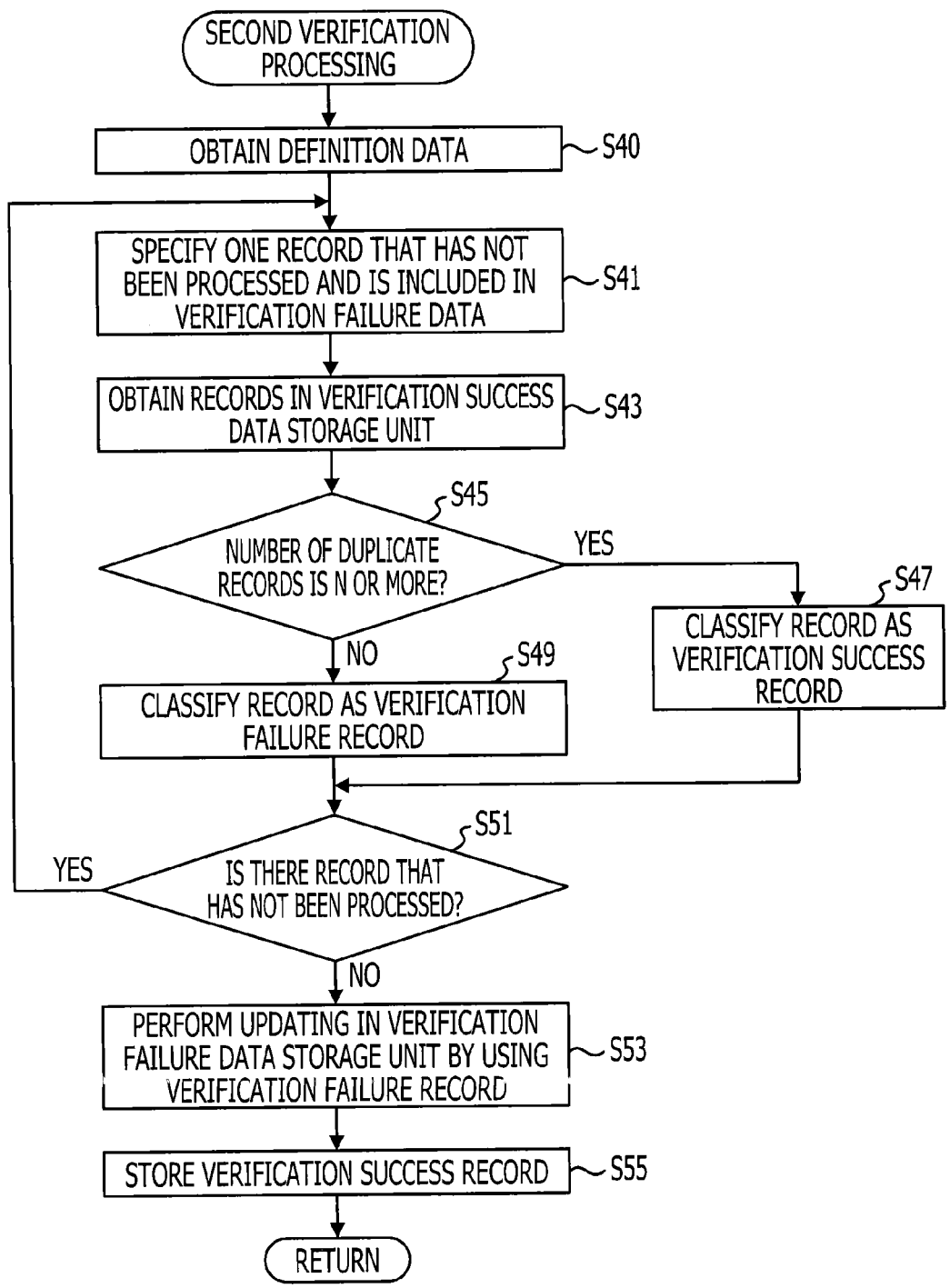
FIG. 14 illustrates an example of a processing flow for second verification processing.

In the second verification processing, the second verification processing unit 160 obtains the definition data from the definition data storage unit 210 (FIG. 14: S40). Specifically, items to be verified are specified. In the example of FIG. 8, "sex", "age", "height", and "weight" are to be verified. Thereafter, the second verification processing unit 160 specifies one record that has not yet been processed and is included in verification failure data stored in the verification failure data storage unit 150 (S41). Then, the second verification processing unit 160 obtains a record that matches the specified record from the verification success data storage unit 170(S43). In the above example, nothing is currently stored in the verification success data storage unit 170. As such, the number of duplicate records is zero for a record group as illustrated in FIG. 13.

Then, the second verification processing unit 160 judges whether the number of records that are duplicates of the specified record is N or more (S45). When the data stored in the verification success data storage unit 170 is searched and the number of records that are duplicates of the specified record is N or more, a specific individual is not identified. Thus, the specified record may be judged to be a verification success record. As a result, the number of records judged to be verification success records may increase and thus the number of records distributed to target systems may increase. This may enable personal information to be anonymized with reliability, while reducing the influence on statistical processing.

Accordingly, the second verification processing unit 160 classifies the specified record as a verification success record (S47). For example, the second verification processing unit 160 registers the specified record in a verification success list in a storage device, such as a main memory. Then, the process proceeds to S51.

On the other hand, when the number of duplicate records is less than N, then the second verification processing unit 160 classifies the specified record as a verification failure record (S49). For example, the second verification processing unit 160 registers the specified record in a verification failure list in a storage device, such as a main memory. Thereafter, the second verification processing unit 160 judges whether there is a record that has not yet been processed in the verification failure data (S51). If there is a record that has not yet been processed, then the process returns to S41. On the other hand, if there is no record that has not yet been processed, then the second verification processing unit 160 updates data stored in the verification failure data storage unit 150 with a verification failure record (S53). Then, the second verification processing unit 160 outputs a verification success record to the distribution processing unit 180, and the distribution processing unit 180 stores the received verification success record in the distribution data storage unit 190 (S55). Thereafter, the process returns to processing of the call source.

In the example described above, since nothing is stored in the verification success data storage unit 170, data stored in the verification failure data storage unit 150 is the same as that illustrated in FIG. 13. Data stored in the distribution data storage unit 190 is also the same as that illustrated in FIG. 12.

Returning to the description of processing of FIG. 6, the distribution processing unit 180 updates the verification success data storage unit 170 using the data that has been received from the first verification processing unit 140 and the second verification processing unit 160 and is stored in the distribution data storage unit 190 (S11). In this embodiment, data as illustrated in FIG. 15, for example, is stored in the verification success data storage unit 170. That is, only one record is left among identical records, and the number of duplicate records is registered. If an identical record is included in the verification success data storage unit 170, the number of duplicate records is incremented.

Then, the distribution processing unit 180 distributes verification success data stored in the distribution data storage unit 190 to the target systems 1003 and 1004 (S13). Specifically, verification success data is transmitted via the network 400.

When the above processing is performed, it may be verified that anonymity of more records is secured. Accordingly, more records may be distributed to target systems, allowing appropriate processing to be performed in the target systems.

Note that, in the target systems 1003 and 1004, statistical processing may be performed on the basis of various viewpoints, for example. Furthermore, statistical processing may be performed after data is processed by addition of data on health conditions and data on findings as illustrated in FIG. 16.

A description will be given of a case where data conversion processing is performed on data collected at the next timing and, as a result, data as illustrated in FIG. 17 is obtained. As mentioned above, the numbers in FIG. 17 are added only for the sake of explanation.

In such a case, in the first verification processing, the previous verification failure record illustrated in FIG. 13 and the current record are combined together, and the combined records are searched for identical records. As a result, as illustrated in FIG. 18, records number 3 and number 12 match, records number 10 and number 15 match, records number 4 and number 13 match, and records number 8 and number 14 match. Accordingly, data as illustrated in FIG. 19 is specified as verification success records, and is stored in the distribution data storage unit 190. Moreover, as illustrated in FIG. 20, only record number 11 is specified as a verification failure record, and is temporarily stored in the verification failure data storage unit 150.

Thereafter, in the second verification processing, the verification failure record illustrated in FIG. 20 is compared to data that is illustrated in FIG. 15 and is stored in the verification success data storage unit 170. As a result, it is found that the verification failure record illustrated in FIG. 20 matches the record at the top of FIG. 15, and therefore is stored in the distribution data storage unit 190. Furthermore, data stored in the verification success data storage unit 170 illustrated in FIG. 15 is updated, so that the data is as illustrated in FIG. 21. That is, new records are added, and the number of duplicate records is incremented if identical records are detected. Such processing is repeatedly performed.

Figure 22:
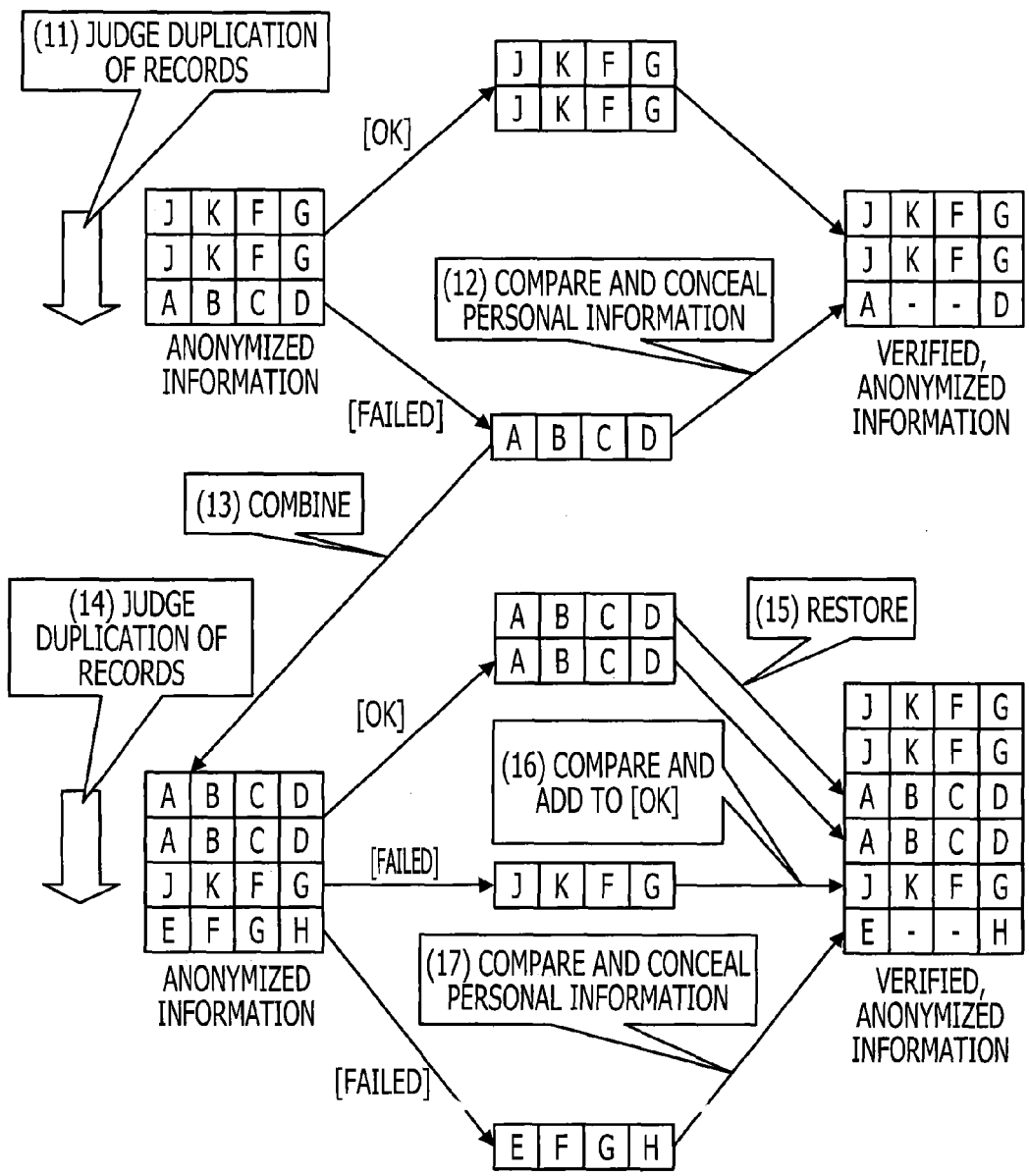
FIG. 22 illustrates the outline of processing according to a second embodiment.

With reference to FIG. 22, the outline of processing according to a second embodiment will be described.

An information processing apparatus that performs processing in this embodiment collects data from one or a plurality of source systems, anonymizes the collected data, and performs a process described below, and then distributes the processed data to target systems that utilize anonymized information. For example, when three records are collected as illustrated on the upper left side of FIG. 22, duplication of records is judged for the three records (step (11)). The three records are data obtained after data conversion processing for anonymization (for example, converting data into data of corresponding range of values, converting data into Japanese syllabary, or discarding an attribute that forms part of the records).

If it is judged in step (11) that two or more records match, for example, there is no personal identifiability, and therefore the two or more records are judged to be [OK] and added to verified, anonymized information. In the example of FIG. 22, the upper two records that include JKFG match, and therefore are added to the verified, anonymized information. The lowermost record that includes attribute values of A, B, C, and D does not match any other record, and, as a result, there is personal identifiability. This record is therefore judged to be [Failed]. The record that includes ABCD, however, is compared to the verified, anonymized information to check whether a record that matches this record is already included in the verified, anonymized information. In this example, there is no record that is a duplicate of the record that includes ABCD, the record that includes ABCD is also judged to be [Failed] in this comparison. In this embodiment, however, part of the record that includes ABCD is concealed, and is distributed together with records of [OK] to target systems (step (12)). Thus, although part of a record is concealed, all the records are distributed to target systems. The record that includes ABCD itself is separately held.

Next, when three records are collected from the source system, the three records are combined with the held record (step (13)), and the total four records are judged in terms of duplication of records (step (14)). For example, when a record that includes ABCD, a record that includes JKFG, and a record that includes EFGH are collected from the source system, these records are judged, in terms of duplication, together with a record that has been judged previously as [Failed] and includes ABCD. There is no personal identifiability in the records that include ABCD, and therefore one of the records is added to the verified, anonymized information. Since the other record has been partially concealed in step (12), the partially concealed record is restored to a record that includes ABCD in the verified, anonymized information (step (15)).

When the record that includes JKFG is judged in terms of duplication among the total four records, the record that includes JKFG does not match any other record, and as a result, there is personal identifiability. The record that includes JKFG is therefore judged to be [Failed]. The record that includes JKFG, however, is compared to the verified, anonymized information to check whether a record that matches this record is already included in the verified, anonymized information. In the example of FIG. 22, since a record that includes JKFG is already included in the verified, anonymized information, the record that is collected this time and includes JKFG is judged to be [OK] and is added to the verified, anonymized information (step (16)).

In contrast, regarding the record that includes EFGH, since there are no records that match this record among the total four records, there is personal identifiability. The record that includes EFGH is therefore judged to be [Failed]. The record that includes EFGH is compared to the verified, anonymized information to check whether a record that matches this record is already included in the verified, anonymized information. In the example of FIG. 22, since there is no record that matches the record that includes EFGH, the record that includes EFGH is judged to be [Failed]. Then, part of the record that includes EFGH is concealed and the record that includes EFGH is distributed together with records of [OK] (step (17)).

In this way, a record without personal identifiability may be restored. Although records collected this time may be partially concealed, all of them are distributed to target systems.

By performing such a process, more records may be enabled to be effectively utilized in target systems. Moreover, each time records are collected, a process as described above is performed on the collected records. This may allow target systems to perform processing such as statistical processing on the latest data without impairing immediacy.

In this embodiment, the entire system configuration is the same as in the first embodiment (FIG. 4), and the configuration of the information processing apparatus 1000 is also the same as in the first embodiment (FIG. 5). However, operations of some components are different from those in the first embodiment. Accordingly, with reference to FIG. 23 to FIG. 37, processing according to this embodiment will be described.

Figure 23:
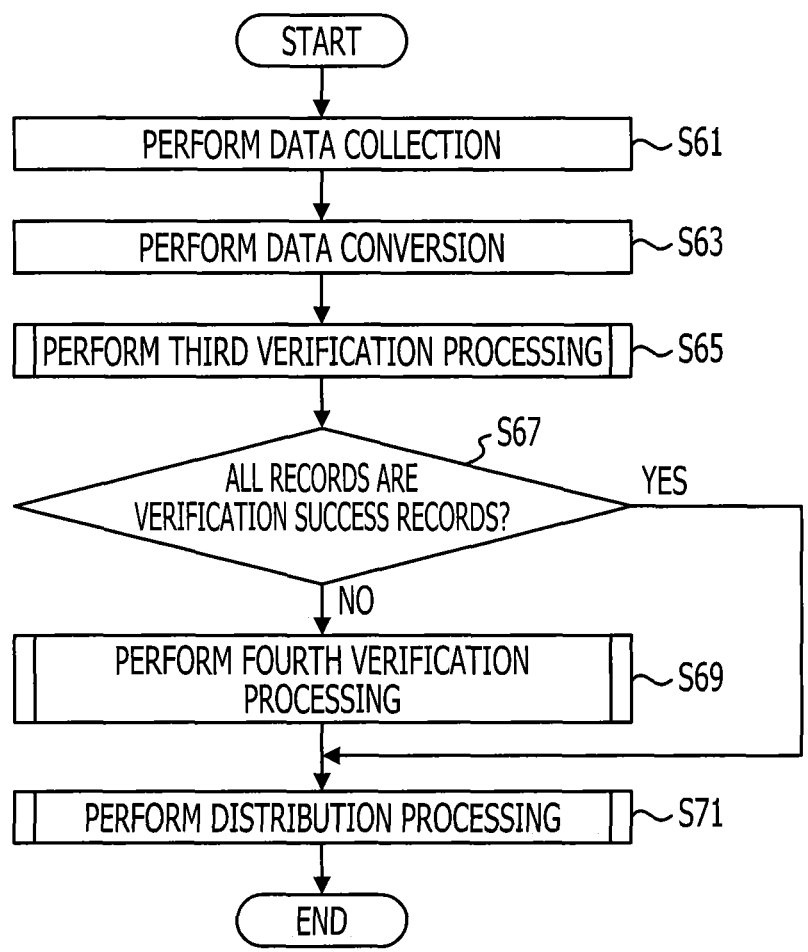
FIG. 23 illustrates an example of a processing flow of an information processing apparatus according to the second embodiment.

First, the data collection unit 100 collects data from the source system A or B, and stores the collected data in the collected data storage unit 110 (FIG. 23: S61). For example, the data collection unit 100 collects data as illustrated in FIG. 7 and stores the data in the collected data storage unit 110.

Then, the data converter 120 performs a specified data conversion in accordance with definition data stored in the definition data storage unit 210, and stores the processing result in the converted data storage unit 130 (S63). In this embodiment, the data converter 120 is set the definition data by the definition management unit 200. An example of the definition data stored in the definition data storage unit 210 is illustrated in FIG. 24. The example of FIG. 24 includes the number of duplications, which is a judging criterion for anonymization, data indicating whether listed items are to be verified, and data indicating whether the listed items are to be concealed. In the example of FIG. 24, "sex", "age", "height", and "weight" are listed as items, and data of other items is discarded for anonymity purposes. Specifically, the data converter 120 discards "personal ID" and "name". In this embodiment, as an example of making data of items ambiguous, it is judged which range of values that has been determined in advance the data of an item that is indicated to be verified belongs to, and then the data of the item is replaced by data that specifies the range of values. As a result, the data of FIG. 7 is converted into the data illustrated in FIG. 9. This is the same as the first embodiment.

Figure 25:
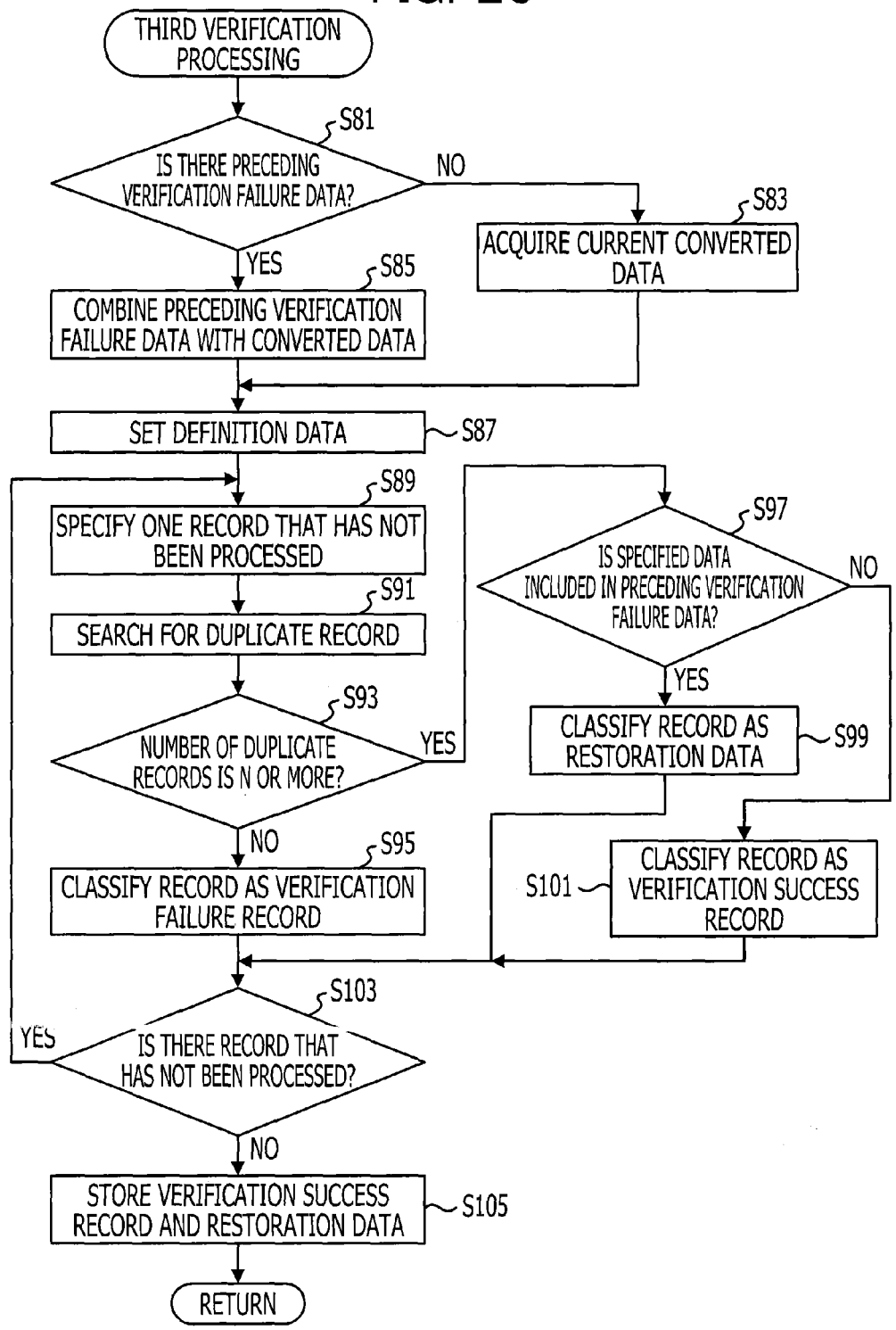
FIG. 25 illustrates an example of a processing flow of third verification processing.

Then, the first verification processing unit 140 performs third verification processing of data stored in the converted data storage unit 130 in accordance with definition data stored in the definition data storage unit 210 (S65). With reference to FIG. 25 to FIG. 27, the third verification processing will be described.

In the third verification processing, first, the first verification processing unit 140 checks whether previous verification failure data is stored in the verification failure data storage unit 150 (S81). If there is no previous verification failure data, then the first verification processing unit 140 reads converted data for the current processing from the converted data storage unit 130 (S83). Then, the process proceeds to S87. On the other hand, if there is previous verification failure data, then the first verification processing unit 140 combines the previous verification failure data with the converted data for the current processing stored in the converted data storage unit 130 (S85).

Then, the first verification processing unit 140 sets definition data stored in the definition data storage unit 210 (S87). Specifically, items to be verified are specified. In the example of FIG. 24, "sex", "age", "height", and "weight" are to be verified.

Then, the first verification processing unit 140 specifies one record that has not yet been processed among data to be processed (the data read in S83 or the data combined in S85) (S89). Thereafter, the first verification processing unit 140 searches for a record that matches the specified record among the data to be processed (S91). In accordance with the definition data illustrated in FIG. 24, the verification is successful if there are two or more records that are identical. When there is no previous verification failure data and processing in S91 is performed on the data illustrated in FIG. 9, a result as illustrated in FIG. 11 is obtained. So far, the processing is the same as in the first embodiment.

Then, the first verification processing unit 140 judges whether the number of records that are duplicates of the specified record is N or more (where N is "2" in the example of the definition data of FIG. 8, and is, in general, an integer that is set to be greater than or equal to 2) (S93). If the number of duplicate records is N or more, then the first verification processing unit 140 judges whether the specified record is included in the previous verification failure data (S97). If the specified record is included in the previous verification failure data, then the first verification processing unit 140 classifies the specified record as restoration data (S99). Specifically, the first verification processing unit 140 registers the specified record in a restoration data list in a storage device, such as a main memory. If the specified record is not included in the previous verification failure data, then the first verification processing unit 140 classifies the specified record as a verification success record (S101). For example, the first verification processing unit 140 registers the specified record and the detected identical records in a verification success list in a storage device, such as a main memory. Then, the process proceeds to S103.

On the other hand, if the number of duplicate records is less than N, then the first verification processing unit 140 classifies the specified record as a verification failure record (S95). In this embodiment, the specified record is stored in the verification failure data storage unit 150.

Then, the first verification processing unit 140 judges whether there is a record that has not yet been processed among data to be processed (S103). If there is a record that has not yet been processed, then the process returns to S89. On the other hand, if there is no record that has not yet been processed, then the first verification processing part 140 outputs the verification success record and the restoration data to the distribution processing unit 180, and the distribution processing unit 180 stores the received verification success record and the restoration data in the distribution data storage unit 190 (S105). Thereafter, the process returns to processing of the call source.

In this way, records are classified into three categories. Records in a first category are included in the previous verification failure data among a group of records for each of which it is judged that the number of records that are duplicates of the record is N or more and therefore the record is a verification success record. Records in a second category are included in data converted this time among the group of verification success records. A third category is a group of records for each of which it is judged that the number of records that are duplicates of the record is less than N and therefore the record is a verification failure record.

With the data as illustrated in FIG. 11, since there is no previous verification failure data, a verification success record group among the data converted this time is a record group as illustrated in FIG. 12. In this embodiment, record management identifiers (IDs) are added to the records of this group, and data as illustrated in FIG. 26 is stored in distribution data storage unit 190. In contrast, the group of verification failure records is a record group as illustrated in FIG. 13. In this embodiment, record management IDs are added to the records of this group, and data as illustrated in FIG. 27 is temporarily stored in the verification failure data storage unit 150.

Figure 28:
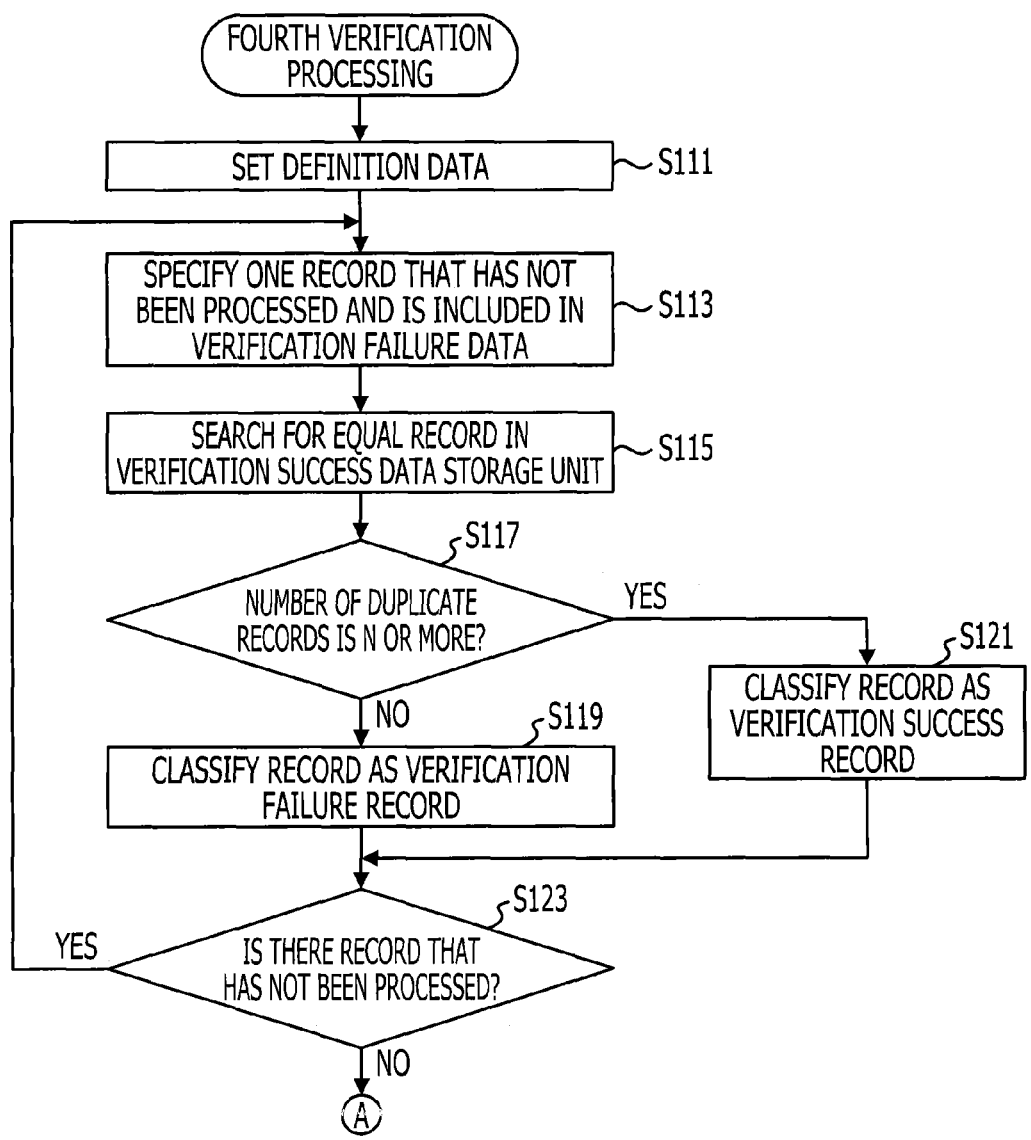
FIG. 28 illustrates an example of a processing flow of fourth verification processing.
Figure 29:
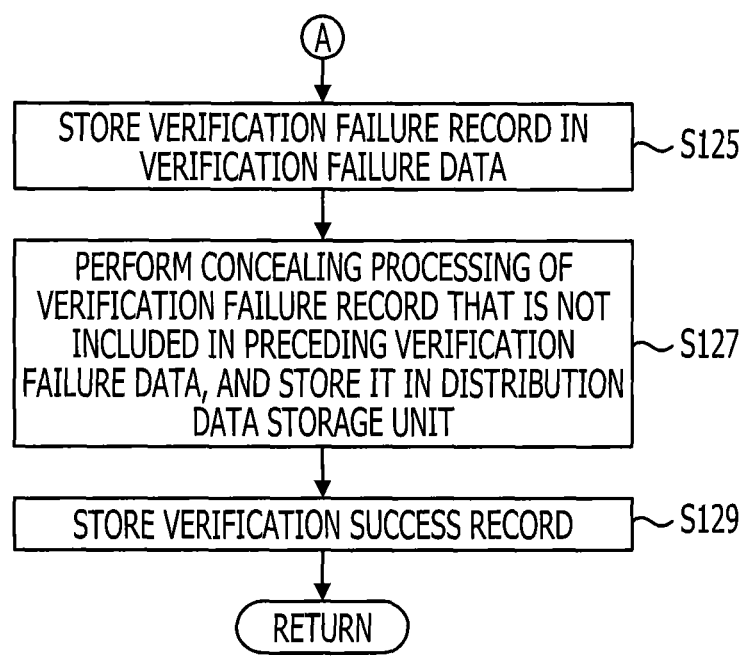
FIG. 29 illustrates an example of a processing flow of the fourth verification processing.

Returning to the description of processing of FIG. 23, the first verification processing unit 140 judges whether all the records in the data to be processed have been judged to be verification success records (S67). If all the records are verification success records, then the process moves to S71. On the other hand, if there is a verification failure record, then the second verification processing unit 160 is instructed to perform processing, and the second verification processing unit 160 performs fourth verification processing (S69). With reference to FIG. 28 to FIG. 30, the fourth verification processing will be described.

In the fourth verification processing, the second verification processing unit 160 sets the definition data stored in the definition data storage unit 210 (FIG. 28: S111). Specifically, items to be verified are specified. In the example of FIG. 24, "sex", "age", "height", and "weight" are to be verified. Thereafter, the second verification processing unit 160 specifies one record that has not yet been processed and is included in verification failure data stored in the verification failure data storage unit 150 (S113). Then, the second verification processing unit 160 searches for a record that matches the specified record in the data stored in the verification success data storage unit 170 (S115). In the above example, nothing is stored in the verification success data storage unit 170. As a result, the number of duplicate records is zero in a record group as illustrated in FIG. 27.

Then, the second verification processing unit 160 judges whether the number of records that are duplicates of the specified record is N or more (S117). If the data stored in the verification success data storage unit 170 is searched and the number of records that are duplicates of the specified record is N or more, a specific individual may not be specified. Thus, the specified record may be judged to be a verification success record. As a result the number of records judged to be verification success records may increase and thus the number of records distributed to target systems may increase. This may enable personal information to be anonymized with reliability, while reducing the influence on statistical processing.

Accordingly, the second verification processing unit 160 classifies the specified record as a verification success record (S121). For example, the second verification processing unit 160 registers the specified record in a verification success list in a storage device, such as a main memory. Then, the process proceeds to S123.

On the other hand, if the number of duplicate records is less than N, then the second verification processing unit 160 classifies the specified record as a verification failure record (S119). For example, the second verification processing unit 160 registers the specified record in a verification failure list in a storage device, such as a main memory. Thereafter, the second verification processing unit 160 judges whether there is a record that has not yet been processed in the verification failure data (S123). If there is a record that has not yet been processed, then the process returns to S113. On the other hand, if there is no record that has not yet been processed, then the second verification processing unit 160 proceeds via a terminal A to processing of FIG. 29.

Moving to the description of processing of FIG. 29, the second verification processing unit 160 stores the verification failure record in data stored in the verification failure data storage unit 150 (S125). Assuming that the number of duplicate records is zero, data as illustrated in FIG. 27 is stored as is in the verification failure data storage unit 150.

The second verification processing unit 160 then performs concealing processing for a verification failure record that is not included in previous verification failure data (for example, the last verification failure data is identified by the record management ID or the like, or the last verification failure data is stored in the verification failure data storage unit 150 and is identified) in accordance with the definition data, and outputs the data after concealing processing to the distribution processing unit 180. The distribution processing unit 180 stores the received data that has been subjected to concealing processing in the distribution data storage unit 190 (S127). If data as illustrated in FIG. 27 is a verification failure record that is not included in the previous verification failure data, the values of items "age", "height", and "weight", for which an instruction for concealing is provided in the definition data, are set to be null so that data as illustrated in FIG. 30 is generated.

The second verification processing unit 160 outputs a verification success record to the distribution processing unit 180, and the distribution processing unit 180 stores the received verification success record in the distribution data storage unit 190 (S129). Thereafter, the process returns to processing of the call source.

Figure 31:
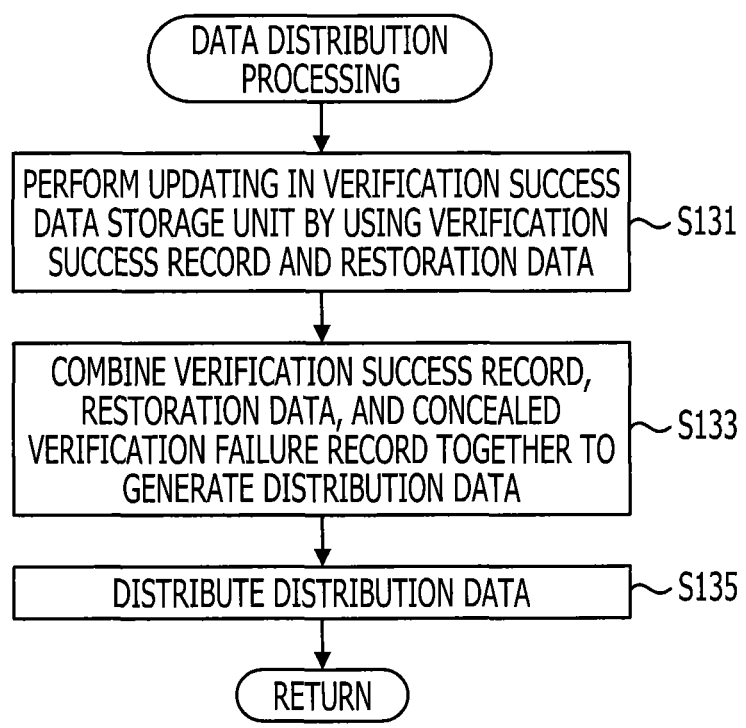
FIG. 31 illustrates an example of a processing flow of data distribution processing.

Returning to the description of processing of FIG. 23, the distribution processing unit 180 performs data distribution processing (S71). With reference to FIG. 31 and FIG. 32, the data distribution processing will be described.

The distribution processing unit 180 updates the verification success data storage unit 170 with the verification success records and the restoration data that have been received from the first verification processing unit 140 and the second verification processing unit 160 and are stored in the distribution data storage unit 190 (FIG. 31: S131). In this embodiment, data as illustrated in FIG. 15, for example, is stored in the verification success data storage unit 170. That is, only one record is left among identical records, and the number of duplicate records is registered. If an identical record is already included in the verification success data storage unit 170, the number of duplicate records is incremented. Because records are aggregated in the above manner, record management IDs are not stored in the verification success data storage unit 170.

Furthermore, the distribution processing unit 180 combines the verification success record, the restoration data, and the partially-concealed verification failure record together to generate distribution data (S133). Then, the distribution processing unit 180 distributes the generated distribution data to the target systems 1003 and 1004 (S135). For example, distribution data as illustrated in FIG. 32 is distributed to the target systems 1003 and 1004. As described above, records of number 3, number 4, number 8, and number 10 are partially concealed, and the values of items "age", "height", and "weight" of the records are set to null. Then, the processing of the call source is performed again.

When such processing is performed, for records for which it is verified that anonymization is secured, data that has been subjected to data conversion is distributed as is to the target systems, and for the records for which it is not verified that anonymization is secured, data on which concealment has been performed is distributed to the target systems. Thus, appropriate processing may be performed in the target systems.

A description will be given of a case where when data conversion processing is performed on data collected at the subsequent timing, data as illustrated in FIG. 17 is obtained.

In such a case, in the third verification processing, the previous verification failure record illustrated in FIG. 13 and the current record are combined together, and identical records are searched for in the combined records. As a result, as illustrated in FIG. 18, records number 3 and number 12 match, records number 10 and number 15 match, records number 4 and number 13 match, and records number 8 and number 14 match.

Accordingly, as illustrated in FIG. 33, records number 3, number 4, number 8, and number 10 are specified as restoration data. As illustrated in FIG. 34, records number 12 to number 15 are specified as verification success records. As illustrated in FIG. 35, the record number 11 is specified as a verification failure record and is temporarily stored in the verification failure data storage unit 150. The verification success records and the verification failure record may be provided with record management IDs by the first verification processing unit 140, and may be provided by the distribution processing unit 180.

Thereafter, in the fourth verification processing, the verification failure record illustrated in FIG. 35 is compared to data illustrated in FIG. 15 that is stored in the verification success data storage unit 170. It is found that the verification failure record in FIG. 35 matches the top record in FIG. 15, and therefore the verification failure record in FIG. 35 is also stored in the distribution data storage unit 190. Then, data stored in the verification success data storage unit 170 illustrated in FIG. 15 is updated, so that the data as illustrated in FIG. 21 is obtained. That is, new records are added, and the number of duplicate records is incremented if identical records are detected. The above processing is repeatedly performed.

Although the distribution processing unit 180 combines the verification success record, the restoration data, and the partially-concealed verification failure record together to generate distribution data, in the example described above there is no verification failure record, and therefore distribution data as described in FIG. 36 is generated using the restoration data and the verification success records. In this embodiment, record management IDs are also included in the distribution data. On the target system side, upon receiving records that include management IDs identical to those of records that have already been received, the target systems updates using the records included in the currently received data. That is, the data from the original records is restored. In the example of FIG. 36, the upper four rows are transmitted in order to update records that have already been distributed. In contrast, for records specified as new verification success records, there are no records identical to these records on the target system side, and therefore the new verification success records are added to the databases on the target system side.

Then, in the target systems 1003 and 1004, data as illustrated in FIG. 32 is updated to data as illustrated in FIG. 37.

As described above, while the embodiments of this technology have been described, this technology is not limited to this. The functional block diagram referred to in the above description may not be exactly the same as actual program modules. The data structure and manners of holding data are examples, and the examples described above are only one kind of example. Moreover, although an example of performing processing of one type of data is demonstrated, a plurality of types of data is sometimes handled. In that case, a verification success record, a verification failure record, and restoration data are distinguished by attaching an identifier.

With regard to the processing flow, the order of execution of steps is sometimes changed as long as the processing results do not change, and the steps are sometimes executed in parallel.

Figure 38:
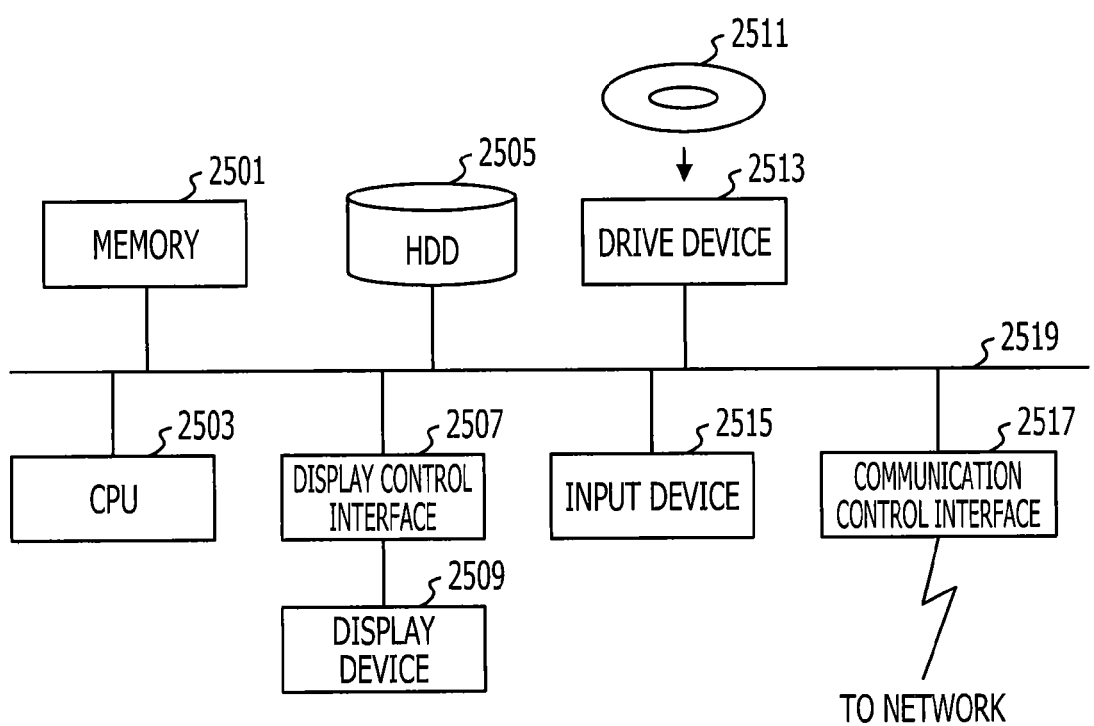
FIG. 38 illustrates an example of a hardware configuration of a computer.

The information processing apparatus 1000, the source systems 1001 and 1002, and the target systems 1003 and 1004 are implemented as one or a plurality of computer devices, in which, as illustrated in FIG. 38, a memory 2501, a central processing unit (CPU) 2503, a hard disk drive (HDD) 2505, a display control interface 2507 coupled to a display device 2509, a drive device 2513 for a removable disk 2511, an input device 2515, and a communication control interface 2517 for connection to a network are coupled via a bus 2519. An operating system (OS) and an application program for performing processing in this embodiment are stored in the HDD 2505 or the removable disc 2511, and are read from the HDD 2505 into the memory 2501 when they are executed by the CPU 2503. By executing the application program, the CPU 2503 implements functions of the data collection unit 100, the data converter 120, the definition management unit 200, the first verification processing unit 140, the second verification processing unit 160, and the distribution processing unit 180. The CPU 2503 controls the display control interface 2507, the communication control interface 2517, and the drive device 2513 in accordance with the contents of processing of the application program. Although data being processed is primarily stored in the memory 2501, the data may be stored in the HDD 2505.

The CPU 2503 is an example of a processor that reads out and executes the application program. The processor is hardware, such as the CPU 2503, a graphics processing unit (GPU), floating point unit (FPU) or digital signal processor (DSP), that carries out operations based on at least one program (such as the application program) and controls other hardware.

In the embodiments of this technology, the application program for performing the processing described above may be stored in and distributed from the computer-readable removable disk 2511, and is installed from the drive device 2513 into the HDD 2505. The application program may also be installed via a network such as the Internet and the communication control interface 2517 into the HDD 2505. In such a computer device, hardware, such as the CPU 2503 and the memory 2501 mentioned above, and programs, such as the OS and the application program, cooperate systematically, so that various functions as described above are achieved.

An information processing method according to this embodiment includes (A) a first process of extracting, from a plurality of records acquired from a first system, a first record that is a record for which the number of records meeting a identity condition that has been determined in advance is greater than or equal to a certain number, (B) a second process of extracting, from a second record that is a record other than the first record among the plurality of records, a third record that is a record for which the number of records of a combination of a record group already extracted and stored in a data storage unit and the second record that meets the identity condition is greater than or equal to the certain number, as the record for which the number of records that meet the identity condition is greater than or equal to the certain number, and (C) a third process of outputting the first record and third record to a second system.

By performing the above processing, more records may be enabled to be output to the second system. That is, more records whose anonymity is secured may be enabled to be utilized in the second system. In the data storage unit, data that is an aggregate of records having a sameness that has been determined in advance may be held, or all the records may be accumulated. According to one aspect, out of the data included in the data group, the quantity of data that is judged to be not meeting a condition for data may be suppressed.

The plurality of records described above may include a record newly acquired from the first system and a record that has been previously acquired from the first system and has not been extracted in the first processing and the second processing. In this way, even when verification results in failure once, there is a possibility that anonymity may be secured with the aid of a record group obtained later.

Moreover, the above information processing method may further include (D) a fourth process of concealing an attribute value of at least part of a fourth record that is a record other than the first record and the third record among the plurality of records and thus generating a fifth record, (E) a fifth process of outputting the fifth record to the second system, (F) a sixth process of extracting, from the record newly acquired from the first system and the fourth record, a record for which the number of records that meet the identity condition that has been determined in advance is greater than or equal to the certain number, and (G) a seventh process of outputting data for restoring the fifth record back to the fourth record when the record extracted in the sixth processing is the fourth record. In this way, records whose anonymity is not secured may be output to the second system after concealment is performed on the records. Moreover, when anonymity is secured by using the record collected later, it becomes possible to provide an instruction for restoring a record on which concealment has been performed to its original data.

Figure 39:
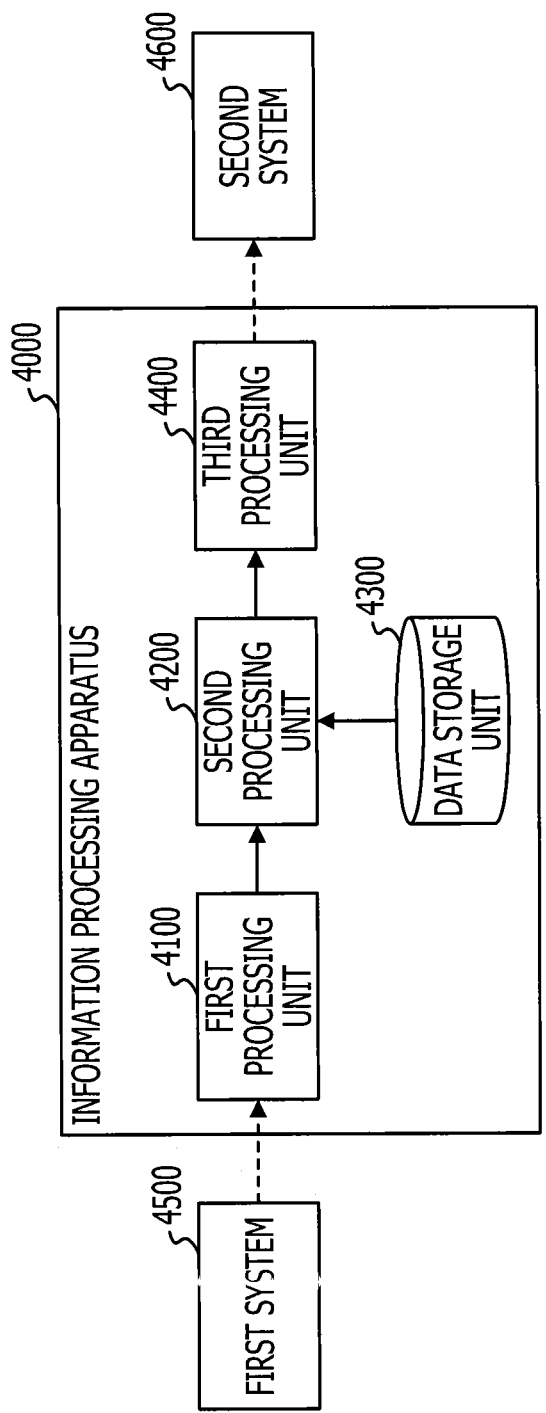
FIG. 39 illustrates an example of functional blocks of an information processing apparatus according to an embodiment.

Moreover, an information processing apparatus (FIG. 39: 4000) according to this embodiment includes a first processing unit (FIG. 39: 4100) that extracts, from a plurality of records acquired from the first system 4500, a first record that is a record for which the number of records that meet a identity condition that has been determined in advance is greater than or equal to a certain number, a second processing unit (FIG. 39: 4200) that extracts, from a second record that is a record other than the first record among the plurality of records, a third record that is a record for which the number of records, of a combination of a record group already extracted and stored in a data storage unit (FIG. 39: 4300) and the second record, that meet the identity condition is greater than or equal to the certain number, as the record for which the number of records meeting the identity condition is greater than or equal to the certain number, and a third processing unit (FIG. 39: 4400) that outputs the first record and the third record to the second system 4600.

A program for causing a computer to perform the processing as described above may be created, and the program is stored in a computer-readable storage medium or a storage device, examples of which include a floppy disk, an optical disk such as a compact disk read-only memory (CD-ROM), a magneto-optical disk, a semiconductor memory (for example, read only memory (ROM)), and a hard disk. Data being processed is temporarily kept in a storage device, such as a random access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A judgment apparatus comprising:
a memory; and
a processor that executes a program, stored in the memory, including a procedure, the procedure including:
obtaining a plurality of pieces of data having a certain relationship with a specific number or more of pieces of data included in a first data group, in the case that a piece of data included in a second data group different from the first data group does not have the certain relationship with the specific number or more of pieces of data included in the second data group;
judging whether the piece of data has the certain relationship with the specific number or more of pieces of data included in the obtained plurality of pieces of data; and
anonymizing personal information by storing the piece of data in a storage device in the case that the piece of data is judged to have the given relationship with the specific number or more pieces of data.

2. The judging apparatus according to claim 1, wherein the procedure further includes:
storing the plurality of pieces of data in the storage device in advance of the obtaining.

3. The judging apparatus according to claim 1, wherein
the certain relationship is a relationship in which a certain portion of first data is identical to the certain portion of second data.

4. The judging apparatus according to claim 1, wherein
the second data group includes data other than the plurality of pieces of data of the first data group.

5. The judging apparatus according to claim 1, wherein
at least part of each piece of data other than the plurality of pieces of data of the first data group is concealed, and the data of which at least part is concealed is stored in the storage device, and
in the case that the data other than the plurality of pieces of data of the first data group has the certain relationship with the specific number or more of pieces of data included in a third data group different from the first data group, a concealed portion of the data of which at least part is concealed is restored to original data.

6. A judgment method comprising:
storing, in a storage device, a plurality of pieces of data having a certain relationship with a specific number or more of pieces of data included in a first data group;
judging, in the case that a piece of data included in a second data group different from the first data group does not have the certain relationship with the specific number or more of pieces of data included in the second data group, whether the piece of data has the certain relationship with the specific number or more of pieces of data included in the plurality of pieces of data stored in the storage device, by a processor; and anonymizing personal information by storing the piece of data in the storage device in the case that the piece of data is judged to have the given relationship with the specific number or more pieces of data.

7. The judging method according to claim 6, wherein the certain relationship is a relationship in which a certain portion of first data is identical to the certain portion of second data.

8. The judging method according to claim 6, wherein the second data group includes data other than the plurality of pieces of data of the first data group.

9. The judging method according to claim 6, wherein
at least part of each piece of data other than the plurality of pieces of data of the first data group is concealed, and the data of which at least part is concealed is stored in the storage device, and in the case that the data other than the plurality of pieces of data of the first data group has the certain relationship with the specific number or more of pieces of data included in a third data group different from the first data group, a concealed portion of the data of which at least part is concealed is restored to original data.

10. A computer-readable recording medium storing a judgment program that causes a computer to execute a procedure, the procedure comprising:

obtaining a plurality of pieces of data having a certain relationship with a specific number or more of pieces of data included in a first data group, in the case that a piece of data included in a second data group different from the first data group does not have the certain relationship with the specific number or more of pieces of data included in the second data group;

judging whether the piece of data has the certain relationship with the specific number or more of pieces of data included in the obtained plurality of pieces of data; and anonymizing personal information by storing the certain data in a storage device in the case that the piece of data is judged to have the given relationship with the certain number or more pieces of data.

11. The recording medium according to claim 10, wherein the procedure further includes:

storing the plurality of pieces of data in the storage device in advance of the obtaining.

12. The recording medium according to claim 10, wherein the certain relationship is a relationship in which a certain portion of first data is identical to the certain portion of second data.

13. The recording medium according to claim 10, wherein the second data group includes data other than the plurality of pieces of data of the first data group.

14. The recording medium according to claim 10, wherein
at least part of each piece of data other than the plurality of pieces of data of the first data group is concealed, and the data of which at least part is concealed is stored in the storage device, and in the case that the data other than the plurality of pieces of data of the first data group has the certain relationship with the specific number or more of pieces of data included in a third data group different from the first data group, a concealed portion of the data of which at least part is concealed is restored to original data.

* * * * *